US012529027B2

(12) United States Patent
Bao et al.

(10) Patent No.: US 12,529,027 B2
(45) Date of Patent: Jan. 20, 2026

(54) USE OF *FUSARIUM BRACHYGIBBOSUM* IN PRODUCTION OF MYCELIAL PROTEIN

(71) Applicant: JIANGXI FUSHINE BIOTECHNOLOGY CO., LTD, Jingdezhen (CN)

(72) Inventors: Jianhua Bao, Jingdezhen (CN); Yadong Tu, Jingdezhen (CN); Jialu Li, Jingdezhen (CN); Huiyue Li, Jingdezhen (CN); Yinghui Chen, Jingdezhen (CN)

(73) Assignee: JIANGXI FUSHINE BIOTECHNOLOGY CO., LTD, Jingdezhen (CN)

( * ) Notice: Subject to any disclaimer, the term of this patent is extended or adjusted under 35 U.S.C. 154(b) by 0 days.

(21) Appl. No.: 18/850,239

(22) PCT Filed: Mar. 11, 2024

(86) PCT No.: PCT/CN2024/080930

§ 371 (c)(1),
(2) Date: Sep. 24, 2024

(87) PCT Pub. No.: WO2025/148149

PCT Pub. Date: Jul. 17, 2025

(65) Prior Publication Data

US 2025/0257314 A1 Aug. 14, 2025

(30) Foreign Application Priority Data

Jan. 11, 2024 (CN) ......................... 202410044012.8

(51) Int. Cl.

| | |
|---|---|
| ***C12N 1/14*** | (2006.01) |
| ***A23L 31/00*** | (2016.01) |
| ***C07K 14/37*** | (2006.01) |
| ***C12R 1/77*** | (2006.01) |

(52) U.S. Cl.

CPC .............. *C12N 1/145* (2021.05); *A23L 31/00* (2016.08); *C07K 14/37* (2013.01); *C12R 2001/77* (2021.05)

(58) Field of Classification Search

CPC ......... C12N 1/145; A23L 31/00; C07K 14/37; C12R 2001/77

See application file for complete search history.

(56) References Cited

FOREIGN PATENT DOCUMENTS

| | | | |
|---|---|---|---|
| CN | 101982179 | B | 7/2012 |
| CN | 106474130 | A | 3/2017 |
| CN | 108186579 | A | 6/2018 |
| CN | 108685856 | B | 3/2019 |
| CN | 110934833 | A | 3/2020 |
| CN | 112226373 | B | 4/2021 |
| CN | 115851458 | A | 3/2023 |
| CN | 115820438 | B | 5/2023 |
| CN | 116640753 | A | 8/2023 |
| CN | 116855387 | A | 10/2023 |
| CN | 117229991 | A | 12/2023 |
| CN | 114796280 | B | 6/2024 |

OTHER PUBLICATIONS

First Office Action mailed in CN application No. 202210678843.1, dated Aug. 13, 2023, with English translation.
First Office Action mailed in CN application No. 202410044012.8, dated Jul. 12, 2024, with English translation.
GB5009.May 2016 National Food Safety Standard—Determination of Protein in Foods, with English translation.
International Search Report for PCT/CN2024/080903, mailed Oct. 2, 2024, with English translation.
International Search Report for PCT/CN2023/100482, mailed Jul. 27, 2023, with English translation.
Long Shusheng et al. "Study on Fungi Causing Corn Kernel or Ear Rot in the West Part of Guanzhong Shaanxi" Acta Agriculturae Boreali-occidentalis Sinica, vol. 4, Issue 3, Dec. 31, 1995 (Dec. 31, 1995), pp. 63-66, especially Subsections 2.2, 2.3.
Second Office Action mailed in CN application No. 202210678843.1, dated Feb. 23, 2024, with English translation.
SN/T 3136—2012, with English translation of the preface.

*Primary Examiner* — Kade Ariani
(74) *Attorney, Agent, or Firm* — Barnes & Thornburg LLP; Ryan L. Marshall

(57) ABSTRACT

Use of *Fusarium brachygibbosum* in the production of mycelial protein is provided, belonging to the technical field of microbial fermentation. It is proposed for the first time that the *Fusarium brachygibbosum* shows the characteristic of a high production yield of the mycelial protein that is significantly higher than that of other types of *Fusarium* reported so far. The mycelial protein produced by the *Fusarium brachygibbosum* is filamentous, flesh-colored, elastic, and toxin-free, serving as an ideal alternative protein. Therefore, the use provides a new means for industrial production of alternative proteins and a basis for the development of safe food. Moreover, the fermentation method in the use may greatly improve the production efficiency of the mycelial protein while reducing carbon emissions to protect the environment.

10 Claims, 2 Drawing Sheets

Specification includes a Sequence Listing.

SEQUENCE LISTING

```
Sequence total quantity: 6
SEQ ID NO: 1            moltype = DNA  length = 20
FEATURE                 Location/Qualifiers
source                  1..20
                        mol_type = other DNA
                        note = Forward primer of TEF1
                        organism = synthetic construct
SEQUENCE: 1
atgggtaagg argacaagac                                              20

SEQ ID NO: 2            moltype = DNA  length = 19
FEATURE                 Location/Qualifiers
source                  1..19
                        mol_type = other DNA
                        note = Reverse primer of TEF1
                        organism = synthetic construct
SEQUENCE: 2
ggargtacca gtsatcatg                                               19

SEQ ID NO: 3            moltype = DNA  length = 22
FEATURE                 Location/Qualifiers
source                  1..22
                        mol_type = other DNA
                        note = Forward primer of ITS1
                        organism = synthetic construct
SEQUENCE: 3
ggaagtaaaa gtcgtaacaa gg                                           22

SEQ ID NO: 4            moltype = DNA  length = 19
FEATURE                 Location/Qualifiers
```

-continued

```
source                  1..19
                        mol_type = other DNA
                        note = Reverse primer of ITS1
                        organism = synthetic construct
SEQUENCE: 4
ggtccgtgtt tcaagacgg                                         19

SEQ ID NO: 5            moltype = DNA  length = 612
FEATURE                 Location/Qualifiers
source                  1..612
                        mol_type = other DNA
                        note = TEF1  sequence of Fusarium brachygibbosum
                        organism = synthetic construct
SEQUENCE: 5
gactctggca agtcgaccac tgtaagtacc accaagcctc gaccccgcct agatttggtg  60
gggtagtctc aagattcatc catactgaca tactttgata gaccggtcac ttgatctacc  120
agtgcggtgg tatcgacaag cgaaccatcg agaagttcga gaaggttggt ctcatttccc  180
tcgatcgcgc gccctttttac ccatcgatcc atcattcgac tcgctctctc acgacgactc  240
gatccgcgcc cgttaccccg ctcgagctca aaaattttgc gaatcaatcg taattttttt  300
cttgatgggg ctcataccc gccactcgag tgacgggcgc gcttgccctc ttcccacagt  360
catattcata tgggcgcgca tcatcacgtg tctaccagtc actaaccact tgacaatagg  420
aagccgccga gctcggtaag ggttccttca agtacgcctg ggttcttgac aagctcaagg  480
ccgagcgtga gcgtggtatc accattgata tcgctctctg gaagttcgag actcctcgct  540
actatgtcac cgtcattggt atgctgtcac cgttgccttc atcacatcct catactaaca  600
cgtccaccag ac                                                612

SEQ ID NO: 6            moltype = DNA  length = 1065
FEATURE                 Location/Qualifiers
source                  1..1065
                        mol_type = other DNA
                        note = ITS1 sequence of Fusarium brachygibbosum
                        organism = synthetic construct
SEQUENCE: 6
ccgagtttac aactcccaaa cccctgtgaa catacctta tgttgcctcg gcggatcagc  60
ccgcgccccg taaaacggga cggcccgccg caggaaccac aaaactctga ttttagtgta  120
acttctgagt ctaaaaaaca aataaatcaa aactttcaac aacggatctc ttggttctgg  180
catcgatgaa gaacgcagca aaatgcgata agtaatgtga attgcagaat tcagtgaatc  240
atcgaatctt tgaacgcaca ttgcgcccgc cagtattctg gcgggcatgc ctgttcgagc  300
gtcatttcaa ccctcaagcc cccgggtttg gtgttgggga tcgggctgta ctccagcccg  360
gccccgaaat ctagtggcgg tctcgctgca gcctccattg cgtagtagct aacacctcgc  420
aactggaacg cggcgcggcc aagccgttaa acccccaact tctgaatgtt gacctcggat  480
caggtaggaa tacccgctga acttaagcat atcaataagc ggaggaaaag aaaccaacag  540
ggattgccct agtaacggcg agtgaagcgg caacagctca aatttgaaat ctggctctcg  600
ggcccgagtt gtaatttgta gaggatgctt ttgatgcggt gccttccgag ttccctggaa  660
cgggacgcca tagagggtga gagccccgtc tggttggatg ccaaatctct gtaaagctcc  720
ttcgacgagt cgagtagttt gggaatgctg ctctaaatgg gaggtatatg tcttctaaag  780
ctaaataccg gccagagacc gatagcgcac aagtagagtg atcgaaagat gaaaagcact  840
ttgaaaagag agttaaaaag tacgtgaaat tgttgaaagg gaagcgttta tgaccagact  900
tgggcttggt taatcatctg ggttctccc cagtgcactt ttccagtcca ggccagcatc  960
agttttcgcc gggggataaa ggcttcggga atgtggctcc ctccggggag tgttatagcc  1020
cgttgcgtaa taccctggcg gggactgagg ttcgcgcttc tgcaa                1065
```

USE OF *FUSARIUM BRACHYGIBBOSUM* IN PRODUCTION OF MYCELIAL PROTEIN

CROSS REFERENCE TO RELATED APPLICATIONS

The present application is a national stage application of International Patent Application No. PCT/CN2024/080930, filed on Mar. 11, 2024, which claims priority to the Chinese Patent Application No. 202410044012.8, filed with the China National Intellectual Property Administration (CNIPA) on Jan. 11, 2024, and entitled "USE OF *FUSARIUM BRACHYGIBBOSUM* IN PRODUCTION OF MYCELIAL PROTEIN", both of which are incorporated herein by reference in their entirety.

REFERENCE TO SEQUENCE LISTING

A computer readable XML file entitled "GWPCTP20231209979 seglist", that was created on Jul. 16, 2024, with a file size of about 8,947 bytes, contains the sequence listing for this application, has been filed with this application, and is hereby incorporated by reference in its entirety.

TECHNICAL FIELD

The present disclosure belongs to the technical field of functional microorganisms, and particularly relates to use of *Fusarium brachygibbosum* in production of mycelial protein.

BACKGROUND

Alternative proteins are proteins produced from plant or animal cells or through microbial fermentation. These innovative foods are designed to taste the same or better than traditional animal products, while offering health benefits such as zero cholesterol, low fat, and added dietary fiber at the same or lower cost. Compared to traditional animal production, alternative proteins require less input such as land, fertilizers, and water, and produce fewer negative externalities such as greenhouse gas emissions and air pollution. Moreover, alternative proteins also reduce the contribution of food production to pandemic risks and antimicrobial resistance.

Microbial fermentation protein, as one of the alternative forms of protein production, is produced by microbial or algae fermentation. This type of protein contains cellulose, rich enzymes, and biologically-active substances, and are cholesterol-free, making it friendlier to patients with cardiovascular and cerebrovascular diseases. Industrially, the main bacteria species used for fermentation of microbial protein meat include algae, yeast, and filamentous fungi. Algae face problems such as slow growth and low density, and so far they have mainly been used for small-scale protein production. The yeast has the advantages of rapid growth, high cell density, and simple production equipment. However, the low cell wall digestibility and high nucleic acid content restrict the further development of yeast fermentation protein to a certain extent. The main protein-producing filamentous fungi are *Fusarium*. The mycelium produced by *Fusarium* is more delicious than the proteins produced by single-cell yeast and bacteria, and has a meat-like tissue structure. Meanwhile, the mycelium contains rich edible crude fiber that helps human gastrointestinal digestion, making it a meat substitute that meets the nutritional demands of modern people. Currently, a strain of *Fusarium venenatum* has been developed for high protein content mycelium meat production (patent CN115851458A), but its yield needs to be improved. In addition, patent CN116640753 shows that the production of mycelial protein in *Fusarium venenatum* can be effectively promoted by deleting the pyruvate decarboxylase gene FvPDC6 in the bacterial cell. This indicates that natural high-protein-producing filamentous fungi are extremely scarce at present. Accordingly, the search for more potential filamentous fungal species that naturally provide high protein yields is a highly commercial endeavor.

SUMMARY

In view of this, an objective of the present disclosure is to provide use of a novel *Fusarium* strain in the production of mycelial protein.

The present disclosure provides use of *Fusarium brachygibbosum* or a microbial inoculant thereof in the production of mycelial protein.

In some embodiments, the *Fusarium brachygibbosum* is selected from the group consisting of a *Fusarium brachygibbosum* strain with a translation elongation factor 1 (TEF1) gene sequence that is at least 95% identical to SEQ ID NO: 5 and/or an internal transcribed spacer 1 (ITS1) gene sequence that is at least 97% identical to SEQ ID NO: 6 and a composition formed by the *Fusarium brachygibbosum* strain.

In some embodiments, the *Fusarium brachygibbosum* includes a *Fusarium brachygibbosum* strain FXFB001; and the *Fusarium brachygibbosum* strain FXFB001 has a deposit number of China General Microbiological Collection Center (CGMCC) NO: 41066.

In some embodiments, the *Fusarium brachygibbosum* includes a spore form and/or a mycelium form.

The present disclosure further provides an edible mycelium, where based on a dry mass of the edible mycelium, the edible mycelium has a protein content of at least 40%, and/or a dietary fiber content of at least 20%, and/or a fat content of at most 8%; and the edible mycelium is derived from *Fusarium brachygibbosum*; and the *Fusarium brachygibbosum* is the *Fusarium brachygibbosum* in the use.

In some embodiments, the edible mycelium is elastic and/or tough.

The present disclosure further provides a *Fusarium brachygibbosum* strain FXFB001, where the strain has a deposit number of CGMCC NO: 41066.

The present disclosure further provides a microbial inoculant for producing protein or a protein-rich mycelium, including the *Fusarium brachygibbosum* strain FXFB001 and an auxiliary material acceptable to the microbial inoculant.

In some embodiments, a mass ratio of the *Fusarium brachygibbosum* strain FXFB001 to the auxiliary material are at 1-10:1-100.

In some embodiments, the auxiliary material is one or more selected from the group consisting of a medium, an additive, and a carrier.

The present disclosure further provides use of the *Fusarium brachygibbosum* strain FXFB001 or the microbial inoculant in producing protein or a protein-rich mycelium.

The present disclosure further provides a method for producing an edible mycelium using *Fusarium brachygibbosum*, including the following steps:

inoculating a seed liquid prepared from the *Fusarium brachygibbosum* or a microbial inoculant thereof into a fermentation medium to allow fermentation culture to obtain a fermentation broth; and sterilizing the fermentation broth, and separating a resulting fermentation product to obtain the edible mycelium; where the *Fusarium brachygibbosum* is the *Fusarium brachygibbosum* in the use.

In some embodiments, the fermentation medium includes a fermentation medium 1 and/or a fermentation medium 2;

the fermentation medium 1 includes the following components: 23 g/L to 27 g/L of starch, 0.8 g/L to 1.2 g/L of citric acid, 0.8 g/L to 1.2 g/L of potassium dihydrogen phosphate, 4.5 g/L to 5.5 g/L of ammonium sulfate, 17 mg/L to 21 mg/L of a magnesium salt based on Mg, 2.8 mg/L to 43 mg/L of a calcium salt based on Ca, 0.48 mg/L to 0.62 mg/L of a manganese salt based on Mn, 0.96 mg/L to 1.05 mg/L of a ferric salt or a ferrous salt based on Fe, 0.72 mg/L to 0.91 mg/L of a zinc salt based on Zn, 0.44 mg/L to 0.54 mg/L of a cobalt salt based on Co, and 0.08 mg/L to 0.12 mg/L of a multivitamin; and the fermentation medium 2 includes the following components: 15-60 kg/m$^3$ of glucose, 0.5-1.5 kg/m$^3$ of $K_2SO_4$, 0.4-0.8 kg/m$^3$ of $H_3PO_4$, 9.75-58.5 g/m$^3$ of a magnesium salt based on Mg, 2.2-22.5 g/m$^3$ of a zinc salt based on Zn, 2.46-9.85 g/m$^3$ of a manganese salt based on Mn, 0.1-0.3 kg/m$^3$ of calcium acetate, and 0.08-0.12 kg/m$^3$ of a defoamer.

In some embodiments, when the fermentation culture is carried out with the fermentation medium 1, the fermentation culture specifically includes the following steps:

conducting the fermentation culture under ventilation with a rate of 900 L/h to 1,100 L/h and a pressure of 0.04 MPa to 0.06 MPa for 15 h; and conducting feeding at 0.5 mL/L/h to 2.0 mL/L/h under ventilation with a rate of 1,400 L/h to 1,600 L/h, and a pressure of 0.08 MPa to 0.12 MPa after 15 h of the fermentation culture; where the fermentation broth has a pH value of 4.0 to 6.0;

the fermentation culture is conducted at a temperature of 27° C. to 29° C., a rotational speed of 100 rpm to 450 rpm, and a dissolved oxygen rate of 20% to 50% for 68 h to 76 h;

feeding components for the feeding include 280 g/L to 320 g/L of glucose and 0.08 mg/L to 0.12 mg/L of a multivitamin; and the multivitamin includes the following components in parts by mass: 0.08 parts to 0.12 parts of vitamin $B_1$, 0.08 parts to 0.12 parts of vitamin $B_{12}$, 0.08 parts to 0.12 parts of vitamin $B_2$, 0.08 parts to 0.12 parts of vitamin $B_3$, 0.08 parts to 0.12 parts of vitamin $B_5$, 0.08 parts to 0.12 parts of vitamin $B_6$, 0.08 parts to 0.12 parts of vitamin $B_9$, 0.08 parts to 0.12 parts of vitamin C, and 0.08 parts to 0.12 parts of vitamin H.

In some embodiments, when the fermentation culture is carried out with the fermentation medium 2, the fermentation culture is specifically conducted under ventilation at a rate of 900 L/h to 1,600 L/h and a pressure of 0.04 MPa to 0.12 MPa; and the fermentation broth has a pH value of 4.0 to 6.0;

the fermentation culture is conducted at a temperature of 27° C. to 29° C., a rotational speed of 100 rpm to 450 rpm, and a dissolved oxygen rate of 20% to 50% for 72 h to 480 h; and when a reducing sugar content in a fermentation system is less than 2 g/L to 5 g/L, 20% to 90% of the fermentation broth by volume is discharged and the fermentation medium 2 is supplemented to an original volume.

In some embodiments, a method for preparing the seed liquid with the *Fusarium brachygibbosum* includes the following steps:

inoculating the *Fusarium brachygibbosum* into a first seed medium to allow primary seed culture and secondary seed culture in sequence to obtain a secondary seed liquid; and inoculating the secondary seed liquid into a second seed medium to allow tertiary seed culture to obtain a tertiary seed liquid.

In some embodiments, the first seed medium includes the following components: 28 g/L to 32 g/L of glucose, 23 g/L to 27 g/L of a yeast extract powder, 0.8 g/L to 1.2 g/L of potassium dihydrogen phosphate, 17 mg/L to 21 mg/L of a magnesium salt based on Mg, and 3 mg/L to 4 mg/L of a calcium salt based on Ca; and the second seed medium includes the following components: 23 g/L to 27 g/L of starch, 0.8 g/L to 1.2 g/L of citric acid, 0.8 g/L to 1.2 g/L of potassium dihydrogen phosphate, 4.8 g/L to 5.2 g/L of ammonium sulfate, 17 mg/L to 21 mg/L of a magnesium salt based on Mg, 0.003 g/L to 0.004 g/L of a calcium salt based on Ca, 0.48 mg/L to 0.62 mg/L of a manganese salt based on Mn, 0.96 mg/L to 1.05 mg/L of a ferric salt or a ferrous salt based on Fe, 0.72 mg/L to 0.91 mg/L of a zinc salt based on Zn, and 0.44 mg/L to 0.54 mg/L of a cobalt salt based on Co.

In some embodiments, the primary seed culture, the secondary seed culture, and the tertiary seed culture are independently conducted at 25° C. to 30° C.;

the primary seed culture, the secondary seed culture, and the tertiary seed culture are independently conducted for 22 h to 26 h;

the primary seed culture, the secondary seed culture, and the tertiary seed culture are independently conducted at 100 rpm to 200 rpm;

the tertiary seed culture is conducted with a ventilation rate of 8 L/min to 12 L/min;

the tertiary seed culture is conducted at a pressure of 0.04 MPa to 0.06 MPa; and the tertiary seed culture is conducted in a culture system at a pH value of 4.0 to 6.0.

In some embodiments, the fermentation broth is sterilized by heat sterilizing; and the heat sterilizing includes: heating to a first temperature of 60° C. to 70° C. and maintaining the first temperature for 18 min to 22 min, and then heating to a second temperature of 88° C. to 92° C. and maintaining the second temperature for 8 min to 15 min.

In some embodiments, a method for separating the fermentation product includes: subjecting the fermentation broth to solid-liquid separation, and subjecting a resulting solid phase to washing and drying in sequence to obtain the edible mycelium.

The present disclosure further provides use of the edible mycelium or an edible mycelium produced by the method in the preparation of a meat substitute.

In some embodiments, a preparation process does not include structural processing.

The present disclosure provides use of *Fusarium brachygibbosum* in the production of mycelial protein. In the present disclosure, the *Fusarium brachygibbosum* is developed for the first time for fermentation production of the mycelial protein. Experiments have shown that the *Fusarium brachygibbosum* is superior to other *Fusarium* species (such as *Fusarium venenatum* and the like) in fermentation and production of mycelial protein content.

The mycelium has low fat content and high dietary fiber content, with a protein content of at least 55.39%, a total fat content of 7.97%, and a dietary fiber content of 26.01% detected by Kjeldahl nitrogen determination method. The mycelial protein is toxin-free, making it an ideal alternative protein. This indicates that the mycelium produced by the *Fusarium brachygibbosum* has high mycelium protein content, desirable morphology, and no toxic side effects. Therefore, the use provides a new means for industrial production of alternative proteins and lays a foundation for the development of safe food. Moreover, a fermentation method in the use may greatly improve the production efficiency of the mycelial protein while reducing carbon emissions to protect the environment.

The present disclosure further provides a *Fusarium brachygibbosum* strain FXFB001, where the strain has a deposit number of CGMCC NO: 41066. In the present disclosure, the strain FXFB001 is isolated from a forest humus soil sample in the Tibet Autonomous Region. The results of morphological and molecular identification indicate that the strain FXFB001 is *Fusarium brachygibbosum*. After preliminary screening, the strain is identified to produce light yellow, filamentous, and elastic mycelium, and a protein content thereof is at least 55.39% as determined by the Kjeldahl nitrogen determination method. Through fermentation culture, the strain FXFB001 produce protein-rich mycelia with a desirable filamentous shape and a resulting fermentation broth can naturally present a flesh-colored appearance without being heated and has no bad smell. It can be seen that the *Fusarium brachygibbosum* strain FXFB001 is a natural high-protein-producing microbial strain, with a protein yield significantly higher than that of other types of *Fusarium* strains currently reported. In addition, the mycelial protein produced is toxin-free and safe, and has no side effects. As a result, the use provides a new means for industrial production of alternative proteins and lays a foundation for the development of safe food.

DEPOSIT OF BIOLOGICAL MATERIAL

Figure 1:
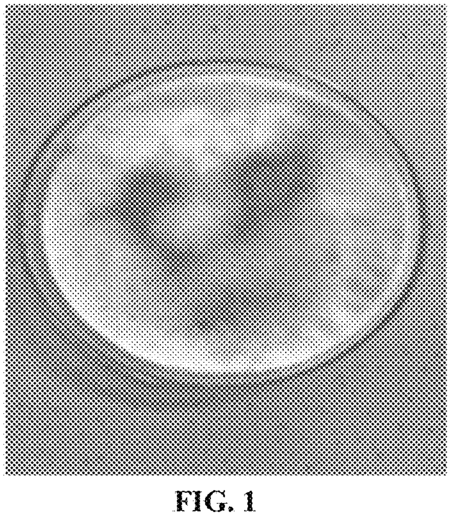
FIG. 1 shows a colony appearance of the strain FXFB001 isolated and purified in Example 1 of the present disclosure.

The *Fusarium brachygibbosum* strain FXFB001 was deposited. (1) The name and address of the depository is China General Microbiological Culture Collection Center (CGMCC) located at No. 1 West Beichen Road, Chaoyang District, Beijing 100101, China; (2) the name and address of the depositor is Jiangxi Fushine Biotechnology Co., Ltd at South side of power plant, Changjiang District, Jingdezhen, Jiangxi, China; (3) the date of deposit was Dec. 13, 2023; (4) The identity of the deposit and the accession number given by the depository is CGMCC NO: 41066; (5) Tthe date of the viability test was Dec. 13, 2023; (6) Tthe procedures used to obtain a sample if the test is not done by the depository were to collect from a forest humus soil sample in Shannan City, Tibet Autonomous Region, culture the sample on MGA 2.5 medium, and purify the strain by the tip culture method on the mycelia; (7) Tthe deposit is capable of reproduction; (8) the biological material is Known and Readily Available to the Public and all restrictions in the access will be irrevocably removed by the Applicant upon granting of the patent; (9) the data supporting the claimed element is attached in the file named "Translation of Deposit"; (10) the deposited material will be maintained with all the care necessary to keep it viable and uncontaminated for a period of at least five years after the most recent request for the furnishing of a sample of the deposited microorganism, and in any case, for a period of at least thirty (30) years after the date of deposit for the enforceable life of the patent, whichever period is longer.

DETAILED DESCRIPTION OF THE EMBODIMENTS

The present disclosure provides use of *Fusarium brachygibbosum* or a microbial inoculant thereof in the production of mycelial protein.

In the present disclosure, the *Fusarium brachygibbosum* includes a single *Fusarium brachygibbosum* strain or a combination of multiple *Fusarium brachygibbosum* strains. There is no special restriction on the strains of *Fusarium brachygibbosum*, and all strains taxonomically identified as *Fusarium brachygibbosum* are within the protection scope of the present disclosure. For example, the *Fusarium brachygibbosum* strains with a TEF1 gene sequence 95%, 96%, 97%, 98%, 99%, and 100% identical to SEQ ID NO: 5 and/or an ITS1 gene sequence 97%, 98%, 99%, and 100% identical to SEQ ID NO: 6 can be used, such as the *Fusarium brachygibbosum* strain FXFB001. The *Fusarium brachygibbosum* strain FXFB001 is deposited under the number of CGMCC NO: 41066, and exhibits excellent performance in producing protein-rich mycelium.

In the present disclosure, the production is preferably fermentation production. The fermentation production involves preparing the microbial cells themselves or direct metabolites or secondary metabolites by means of the life activities of microorganisms under aerobic or anaerobic conditions. In one embodiment, the fermentation production refers to the abundant growth of the *Fusarium brachygibbosum* in a fermentation medium containing nutritional components to obtain the protein-rich mycelium. There is no particular limitation on the appearance of the *Fusarium brachygibbosum*, and any living bacterial appearance of the *Fusarium brachygibbosum* known in the art may be used, such as spores and/or mycelia.

The present disclosure further provides a *Fusarium brachygibbosum* strain FXFB001, where the strain has a deposit number of CGMCC NO: 41066.

In the present disclosure, the *Fusarium brachygibbosum* strain FXFB001 is isolated and purified from a forest humus soil sample in Shannan City, Tibet Autonomous Region. Morphological identification shows that the aerial mycelium grown on a PSA medium are felt-like, white at the beginning, and then gradually turn pink, with the reverse side of the plate ranging from orange-red to dark red; conidial morphology is follows: large conidia are sickle-shaped, slightly pointed at both ends, with 3 to 5 septa, and measured 10.8-25.1 μm×2.0-3.6 μm. The small conidia are fusiform, slightly curved, slightly flat at both ends, with 0 to 2 septa.

The chlamydospores are spherical, solitary in the mycelium, and measured 5.2 μm to 7.5 μm. Molecular identification is also conducted based on TEF1 and ITS sequences. The results show that the TEF1 sequence of the strain FXFB001 is 99.84% identical to *Fusarium brachygibbosum* (NCBI: MK752485.1), and the ITS1 sequence of the strain FXFB001 is 100% identical to *Fusarium brachygibbosum* (NCBI: GQ505450.1). Moreover, the construction of a multi-gene evolutionary tree reveals that the strain FXFB001 and *Fusarium brachygibbosum* are clustered in one branch. Based on the morphological and molecular identification results, the strain FXFB001 is classified as *Fusarium brachygibbosum.*

In an embodiment of the present disclosure, the protein production characteristics of the strain FXFB001 are preliminarily screened. A preliminary screening process preferably includes inoculating the strain FXFB001 into a first seed medium for constant temperature shaking culture, separating a resulting solid phase culture product, drying, and determining the crude protein content. The first seed medium preferably includes the following components: 28-32 g/L of glucose, 23-27 g/L of a yeast extract powder, 0.8-1.2 g/L of potassium dihydrogen phosphate, 0.18-0.22 g/L of magnesium sulfate heptahydrate, 0.009-0.011 g/L of calcium chloride; more preferably 30 g/L of the glucose, 25 g/L of the yeast extract powder, 1.0 g/L of the potassium dihydrogen phosphate, 0.2 g/L of the magnesium sulfate heptahydrate, and 0.01 g/L of the calcium chloride. The constant temperature shaking culture is conducted at preferably 25° C. to 30° C., more preferably 28° C. The constant temperature shaking culture is conducted for preferably 45 h to 50 h, more preferably 48 h. The constant temperature shaking culture is conducted at preferably 180 rpm to 220 rpm, more preferably 200 rpm. The separating the solid phase culture product preferably includes conducting suction filtration with a vacuum suction filtration device and washing the filter cake sufficiently. The drying is preferably oven drying. The drying is conducted at preferably 55° C. to 65° C., more preferably 60° C. The protein-rich mycelium prepared by fermentation with the strain FXFB001 is in the form of a filamentous mycelium, and the filter cake is light yellow and elastic, and has a biomass percentage of 0.63% by dry weight. The protein content determined by Kjeldahl nitrogen determination method is at least 55.39%.

The present disclosure further provides a microbial inoculant for producing mycelial protein, including the *Fusarium brachygibbosum* strain FXFB001 and an excipient.

In the present disclosure, the *Fusarium brachygibbosum* strain FXFB001 and the excipient are at a mass ratio of preferably 1-10:1-100, more preferably 1-10:5-80, and even more preferably 1:10-50. The type of the excipient varies according to the dosage form of the microbial inoculant.

In the present disclosure, the microbial inoculant preferably includes a lyophilized powder or an aqueous solution. A preparation method of the aqueous formulation of the microbial inoculant preferably includes preparing a seed liquid of the *Fusarium brachygibbosum* strain FXFB001 and preparing the aqueous solution. A preparation method of the lyophilized powder of the microbial inoculant preferably includes preparing and lyophilizing the seed liquid of the *Fusarium brachygibbosum* strain FXFB001.

In an embodiment of the present disclosure, a preparation process of the seed liquid of the microbial inoculant of the *Fusarium brachygibbosum* strain FXFB001 preferably includes the following steps: inoculating an activated strain FXFB001 into a first medium to allow primary seed culture to obtain a primary seed liquid; inoculating the primary seed liquid into the first medium to allow secondary seed culture to obtain a secondary seed liquid; and inoculating the secondary seed liquid into a second medium to allow tertiary seed culture to obtain a tertiary seed liquid.

In the present disclosure, the culture refers to the rapid growth and reproduction of certain (kinds of) microorganisms by means of artificially prepared media and artificially created culture conditions (such as culture temperature). The first seed medium includes the following components: 28-32 g/L of glucose, 23-27 g/L of a yeast extract powder, 0.8-1.2 g/L of potassium dihydrogen phosphate, 17-21 mg/L of a magnesium salt based on Mg, and 3-4 mg/L of a calcium salt based on Ca; more preferably 30 g/L of the glucose, 25 g/L of the yeast extract powder, 1.0 g/L of the potassium dihydrogen phosphate, 19 mg/L of the magnesium salt based on Mg, and 3.5 mg/L of the calcium salt based on Ca. The second seed medium includes the following components: 23-27 g/L of starch, 0.8-1.2 g/L of citric acid, 0.8-1.2 g/L of potassium dihydrogen phosphate, 4.8-5.2 g/L of ammonium sulfate, 17-21 mg/L of a magnesium salt based on Mg, 3-4 mg/L of a calcium salt based on Ca, 0.48-0.62 mg/L of a manganese salt based on Mn, 0.96-1.05 mg/L of a ferric salt or ferrous salt based on Fe, 0.72-0.91 mg/L of a zinc salt based on Zn, and 0.44-0.54 mg/L of a cobalt salt based on Co; more preferably 25 g/L of the starch, 1 g/L of the citric acid, 1 g/L of the potassium dihydrogen phosphate, 5 g/L of the ammonium sulfate, 19 mg/L of the magnesium salt based on Mg, 3.5 mg/L of the calcium salt based on Ca, 0.56 mg/L of the manganese salt based on Mn, 1 mg/L of the ferric salt or ferrous salt based on Fe, 0.81 mg/L of the zinc salt based on Zn, and 0.49 mg/L of the cobalt salt based on Co. There is no particular limitation on the type of the starch, and any type of starch known in the art may be used, such as sweet potato starch, corn starch, tapioca starch, and potato starch. There is no special restriction on the existence of calcium salt, cobalt salt, and zinc salt, and the metal salts known in the art may be used in the form of each metal salt. For example, the calcium salt exists in one or more forms of calcium chloride, calcium sulfate, and calcium bicarbonate; the cobalt salt preferably exists in the form of cobalt chloride; the zinc salt exists in one or both forms of zinc chloride and zinc sulfate. The magnesium salt preferably includes one or more of magnesium sulfate, magnesium chloride, and magnesium nitrate. The manganese salt preferably includes one or more of magnesium sulfate, manganese chloride, potassium permanganate, and potassium manganate. There is no particular limitation on component sources of the fermentation medium, and any component purchase sources known in the art may be used. There is no particular limitation on the preparation method of the first seed medium and the second seed medium, and any preparation method for microbial culture well known in the art may be used. After preparation, the medium is preferably sterilized. The sterilization process is preferably high-pressure steam sterilization. In an embodiment, the first seed medium preferably includes the following components: 28-32 g/L of glucose, 23-27 g/L of a yeast extract powder, 0.8-1.2 g/L of potassium dihydrogen phosphate, 0.18-0.22 g/L of magnesium sulfate heptahydrate, 0.003-0.004 g/L of calcium chloride; more preferably 30 g/L of the glucose, 25 g/L of the yeast extract powder, 1.0 g/L of the potassium dihydrogen phosphate, 0.2 g/L of the magnesium sulfate heptahydrate, and 0.005 g/L of the calcium chloride. The second seed medium preferably includes the following components: 23-27 g/L of starch, 0.8-1.2 g/L of citric acid, 0.8-1.2 g/L of potassium dihydrogen phosphate, 4.8-5.2 g/L of ammonium sulfate, 0.18-0.22 g/L of magnesium sulfate heptahydrate, 0.003-0.004 g/L of a calcium salt, 1.5-1.9 mg/L of manganese sulfate monohydrate, 4.8-5.2 mg/L of ferrous sulfate heptahydrate, 0.72-0.91 mg/L of zinc chloride, and 0.44-0.54 mg/L of cobalt chloride; more preferably 25 g/L of the starch, 1.0 g/L of the citric acid, 1.0 g/L of the potassium dihydrogen phosphate, 5.0 g/L of the ammonium sulfate, 0.017-0.021 g/L of the magnesium sulfate heptahydrate, 0.01 g/L of the calcium chloride, 1.5 mg/L of the manganese sulfate monohydrate, 5.0 mg/L of the ferrous sulfate heptahydrate, 1.9-2.0 mg/L of the zinc sulfate, and 1.8-2.2 mg/L of the cobalt chloride. In an embodiment, the error in weighing each drug reagent when preparing each medium shall not exceed 10%. The primary seed culture, the secondary seed culture, and the tertiary seed culture are independently conducted at preferably 25° C. to 30° C., more preferably 28° C. The primary seed culture, the secondary seed culture, and the tertiary seed culture are independently conducted for preferably 22 h to 26 h, more preferably 24 h. The primary and secondary seed culture or the tertiary seed culture is preferably conducted in a culture flask. The primary seed culture and the secondary seed culture are conducted at preferably 180 rpm to 220 rpm, more preferably 200 rpm. The secondary seed culture is conducted at an inoculation amount preferably of 4% to 6%, more preferably 5%. The tertiary seed culture is conducted at preferably 100 rpm to 220 rpm, more preferably 150 rpm. During the culture, the culture flask is preferably placed in a shaker for shaking culture. The tertiary seed culture is conducted at an inoculation amount preferably of 5% to 10%, more preferably 8%. There is no particular limitation on the method of seed liquid inoculation, and any inoculation method known in the art may be used, such as a process of transferring a small amount of seed liquid to a corresponding medium using a sterile pipette under sterile conditions. The tertiary seed culture is conducted with an aeration rate of preferably 8 L/min to 12 L/min, more preferably 10 L/min. The tertiary seed culture is conducted at a pressure of preferably 0.04 MPa to 0.06 MPa, more preferably 0.05 MPa. The tertiary seed culture is conducted in a culture system at a pH value of preferably 4.0 to 6.0, more preferably 5.0. The tertiary seed culture is preferably conducted in a culture vessel with a pressure valve. There is no special restriction on the specification and brand of the culture vessel, and any culture vessel known in the art can be used.

In the present disclosure, when the microbial inoculant is prepared, spores are separated from the tertiary seed liquid, and separated spores are mixed with an aqueous solution solvent or a protective agent for lyophilized powder to obtain the aqueous solution or lyophilized powder. The spores are preferably separated by centrifugation. There is no particular limitation on the type of the excipient for aqueous solution, and any type of excipient for aqueous solution known in the art can be used, such as a medium. In the aqueous solution of the microbial inoculant, the strain FXFB001 has an effective spore count of (1-100)×$10^7$ spores/mL, more preferably 5×$10^7$ spores/mL. In the lyophilized powder of the microbial inoculant, the strain FXFB001 has an effective spore count of (1-100)×$10^7$ spores/g, more preferably (1-100)×$10^7$ spores/g.

The present disclosure further provides a method for producing an edible mycelium using *Fusarium brachygibbosum*, including the following steps:

inoculating a seed liquid prepared from the *Fusarium brachygibbosum* or a microbial inoculant thereof into a fermentation medium to allow fermentation culture to obtain a fermentation broth; and sterilizing the fermentation broth, and separating a resulting fermentation product to obtain the edible mycelium; where the *Fusarium brachygibbosum* is the *Fusarium brachygibbosum* in the use.

In the present disclosure, the preparation process of the seed liquid prepared from the *Fusarium brachygibbosum* is the same as described above and will not be repeated here.

In the present disclosure, the fermentation production is to prepare the microbial cells themselves or direct metabolites or secondary metabolites by means of the life activities of microorganisms under aerobic or anaerobic conditions. Generally, fermentation refers to a decomposition process of organic matter by organisms. *Fusarium brachygibbosum* fermentation involves the utilization of *Fusarium brachygibbosum* to decompose the nutrients in the fermentation medium, continuously growing and forming a large amount of mycelium. The fermentation medium includes a nitrogen source, a carbon source, an inorganic salt, and water. The fermentation medium includes a fermentation medium 1 and/or a fermentation medium 2. The fermentation medium 1 includes the following components: 23-27 g/L of starch, 0.8-1.2 g/L of citric acid, 0.8-1.2 g/L of potassium dihydrogen phosphate, 4.5-5.5 g/L of ammonium sulfate, 17-21 mg/L of a magnesium salt based on Mg, 2.8-43 mg/L of a calcium salt based on Ca, 0.48-0.62 mg/L of a manganese salt based on Mn, 0.96-1.05 mg/L of a ferric salt or ferrous salt based on Fe, 0.72-0.91 mg/L of a zinc salt based on Zn, 0.44-0.54 mg/L of a cobalt salt based on Co, and 0.08-0.12 mg/L of a multivitamin; more preferably 25 g/L of the starch, 1 g/L of the citric acid, 1 g/L of the potassium dihydrogen phosphate, 5 g/L of the ammonium sulfate, 19 mg/L of the magnesium salt based on Mg, 25 mg/L of the calcium salt based on Ca, 0.54 mg/L of the manganese salt based on Mn, 1 mg/L of the ferric salt or ferrous salt based on Fe, 0.81 mg/L of the zinc salt based on Zn, 0.49 mg/L of the cobalt salt based on Co, and 0.1 mg/L of the multivitamin. The fermentation medium 2 preferably includes the following components: 15-60 kg/$m^3$ of glucose, 0.5-1.5 kg/$m^3$ of $K_2SO_4$, 0.4-0.8 kg/$m^3$ of $H_3PO_4$, 9.75-58.5 g/$m^3$ of a magnesium salt based on Mg, 2.2-22.5 g/$m^3$ of a zinc salt based on Zn, 2.46-9.85 g/$m^3$ of a manganese salt based on Mn, 0.1-0.3 kg/$m^3$ of calcium acetate, and 0.08-0.12 kg/$m^3$ of a defoamer; more preferably 25-55 kg/$m^3$ of the glucose, 0.8-1.3 kg/$m^3$ of the $K_2SO_4$, 0.5-0.7 kg/$m^3$ of the $H_3PO_4$, 12.5-50.5 g/$m^3$ of the magnesium salt based on Mg, 4.5-20.5 g/$m^3$ of the zinc salt based on Zn, 5.2-7.5 g/$m^3$ of the manganese salt based on Mn, 0.15-0.25 kg/$m^3$ of the calcium acetate, and 0.1 kg/$m^3$ of the defoamer.

There is no particular limitation on the type of the starch, and any type of starch known in the art may be used, such as sweet potato starch, corn starch, tapioca starch, and potato starch. There is no special restriction on the existence of calcium salt, cobalt salt, and zinc salt, and the metal salts known in the art may be used in the form of each metal salt. For example, the calcium salt exists in one or more forms of calcium chloride, calcium sulfate, and calcium bicarbonate; the cobalt salt preferably exists in the form of cobalt chloride; the zinc salt exists in one or both forms of zinc chloride and zinc sulfate. The magnesium salt preferably includes one or more of magnesium sulfate, magnesium chloride, and magnesium nitrate. The ferric salt or ferrous salt based on Fe preferably includes one or more of ferrous sulfate heptahydrate, ferric chloride, or ferrous chloride. The manganese salt preferably includes one or more of magnesium sulfate, manganese chloride, potassium permanganate, and potassium manganate. There is no particular limitation on component sources of the fermentation medium, and any component purchase sources known in the art may be used.

In an embodiment of the present disclosure, the fermentation medium 1 preferably includes the following components: 23-27 g/L of starch, 0.8-1.2 g/L of citric acid, 0.8-1.2 g/L of potassium dihydrogen phosphate, 4.5-5.5 g/L of ammonium sulfate, 0.18-0.22 g/L of magnesium sulfate heptahydrate, 0.008-0.012 g/L of calcium chloride, 1.5-1.9 mg/L of manganese sulfate monohydrate, 4.5-5.5 mg/L of ferrous sulfate heptahydrate, 1.8-2.2 mg/L of zinc chloride, 1.8-2.2 mg/L of cobalt chloride, and 0.08-0.12 mg/L of a multivitamin; more preferably 25 g/L of the starch, 1.0 g/L of the citric acid, 1.0 g/L of the potassium dihydrogen phosphate, 5.0 g/L of the ammonium sulfate, 0.2 g/L of the magnesium sulfate heptahydrate, 0.0034 g/L of the calcium salt, 1.7 mg/L of the manganese sulfate monohydrate, 5.0 mg/L of the ferrous sulfate heptahydrate, 0.8 mg/L of the zinc salt, 0.5 mg/L of the cobalt chloride, and 0.1 mg/L of the multivitamin. In an embodiment, the fermentation medium 2 preferably includes the following components: 35 $kg/m^3$ of glucose, 1.0 $kg/m^3$ of $K_2SO_4$, 0.6 $kg/m^3$ of $H_3PO_4$, 0.25 $kg/m^3$ of magnesium sulfate heptahydrate, 0.05 $g/m^3$ of zinc sulfate heptahydrate, 0.03 $g/m^3$ of manganese sulfate tetrahydrate, 0.1-0.3 $kg/m^3$ of calcium acetate, and 0.1 $kg/m^3$ of a defoamer.

In the present disclosure, there is no particular limitation on the preparation method of the fermentation medium, and any preparation method known in the art can be used. After preparation, the fermentation medium is preferably sterilized. There is no particular limitation on the sterilization method of the fermentation medium, and any sterilization method known in the art, such as high-pressure steam sterilization, may be used. After sterilization, the fermentation medium is placed at room temperature and then inoculated under sterile conditions. There is no special limitation on the inoculation method, and any inoculation method known in the art can be used. For example, in a sterile environment, a certain amount of seed liquid is accurately measured with a sterile container and transferred to the fermentation medium, and then mixed well. The fermentation is preferably completed in a fermentation vessel with a pressure valve. There is no particular limitation on the specification and brand of the fermentation vessel and any fermentation vessel known in the art can be used.

In the present disclosure, in addition to the fermentation medium affecting the fermentation process and results, the fermentation conditions are also important factors affecting the fermentation results. For example, temperature, fermentation time, system pH, dissolved oxygen, rotation speed, pressure, feeding timing, and feeding amount will all affect the fermentation results. The fermentation using fermentation medium 1 preferably includes: within the first 15 h of fermentation culture, the ventilation rate is 900-1,100 L/h, and the pressure is controlled at 0.04-0.06 MPa; after 15 h of fermentation culture, feeding is started at 0.5-2.0 mL/L/h, the ventilation rate is 1,400-1,600 L/h, and the pressure is 0.08-0.12 MPa; the pH value of the fermentation broth is 4.0-6.0; the fermentation culture is conducted at a temperature of 27° C. to 29° C., a rational speed of 100-450 rpm and a dissolved oxygen rate of 20% to 50% for 68 h to 76 h; more In some embodiments, within the first 15 h of fermentation culture, the ventilation rate is 1,000 L/h, and the pressure is controlled at 0.05 MPa; after 15 h of fermentation culture, feeding is started at 1.2 mL/L/h, the ventilation rate is 1,500 L/h, and the pressure is 0.1 MPa; a pH value of the fermentation broth is 5.0; the fermentation culture is conducted at a temperature of 28° C. and 280 rpm, and a dissolved oxygen rate of 35% for 72 h. A feeding rate refers to a volume of a feeding medium added per liter of the medium per hour. When the fermentation culture is conducted using the fermentation medium 1, the feeding medium includes 280-320 g/L of glucose and 0.08-0.12 mg/L of a multivitamin; more preferably 300 g/L of the glucose and 0.1 mg/L of the multivitamin; where the multivitamin includes the following components in parts by mass: 0.08 parts to 0.12 parts of vitamin $B_1$, 0.08 parts to 0.12 parts of vitamin $B_{12}$, 0.08 parts to 0.12 parts of vitamin $B_2$, 0.08 parts to 0.12 parts of vitamin $B_3$, 0.08 parts to 0.12 parts of vitamin $B_5$, 0.08 parts to 0.12 parts of vitamin $B_6$, 0.08 parts to 0.12 parts of vitamin $B_9$, 0.08 parts to 0.12 parts of vitamin C, and 0.08 parts to 0.12 parts of vitamin H. The addition of multivitamin during the fermentation is beneficial to improving elasticity and toughness of the mycelium. There is no particular limitation on component sources of the multivitamin in the fermentation medium, and any multivitamin purchase sources known in the art may be used.

In the present disclosure, the fermentation using fermentation medium 2 preferably includes: the ventilation rate is 900-1,600 L/h, and the pressure is controlled at 0.04-0.12 MPa; a pH value of the fermentation broth is 4.0-6.0; the fermentation culture is conducted at 27° C. to 29° C. and 100-450 rpm with coupled dissolved oxygen of 20% to 50% for 72 h to 480 h; more In some embodiments, the ventilation rate is 1,000-1,400 L/h, and the pressure is controlled at 0.05-0.1 MPa; a pH value of the fermentation broth is 5.0; the fermentation culture is conducted at 28° C. and 280 rpm with coupled dissolved oxygen of 35%. During the fermentation culture, 20% to 90% of the fermentation broth by volume is discharged and the fermentation medium 2 is supplemented to an original volume when the reducing sugar content in the fermentation system is less than 2-5 g/L or 3-4 g/L. The discharged fermentation broth accounts for preferably 30% to 80%, more preferably 40% to 70%, and most preferably 50% of the original fermentation broth. The fermentation medium 2 is supplemented to the original volume within preferably 10 min to 30 min, more preferably 20 min. During the fermentation culture, once the reducing sugar content is lower than 2-5 g/L, feeding is started and the feeding can be repeated multiple times.

In the present disclosure, the fermentation broth is preferably sterilized after the fermentation is completed. The sterilization of the fermentation broth helps the inactivation the live bacteria in the fermentation broth, and further aids the degradation the nucleic acid molecules produced during the fermentation. The reduction of the nucleic acid content in the mycelium obtained by fermentation facilitates subsequent processing and application. The fermentation broth is preferably sterilized by heating sterilization. The heating sterilization is preferably maintained at 60° C. to 70° C. for 18-22 min, and then at 88° C. to 92° C. for 8-15 min; more preferably at 65° C. for 20 min, and then at 90° C. for 12 min.

In the present disclosure, the fermentation product is separated after sterilization. The separation of the fermentation product includes preferably: subjecting the fermentation broth to solid-liquid separation, and subjecting a resulting solid phase to washing and drying in sequence. The solid-liquid separation includes filtration or centrifugation. In an embodiment, the separation of the solid phase culture product preferably includes conducting suction filtration with a vacuum suction filtration device and washing the filter cake sufficiently. After solid-liquid separation, the solid phase is collected and washed with purified water. The washing is conducted preferably 1 to 3 times, more preferably 2 times. The drying is preferably oven drying. The drying is conducted at preferably 55° C. to 65° C., more preferably 60° C. The filter cake is observed, in which the mycelium is in desirable conditions, showing filamentous. The filter cake is light yellow and elastic, and has a biomass percentage of at least 0.63% by dry weight. The protein content determined by Kjeldahl nitrogen determination method is at least 55.39%. After toxin testing, the filter cake is found to be toxin-free. At the same time, the mycelium produced by the *Fusarium brachygibbosum* strain FXFB001 demonstrates excellent characteristics of toxin-free and protein-rich mycelium. Therefore, the present disclosure further provides use of the *Fusarium brachygibbosum* strain FXFB001 or the microbial inoculant in the production of mycelial protein.

The present disclosure further provides an edible mycelium, having, based on the dry mass of the edible mycelium, a protein content of at least 40%, and/or a dietary fiber content of at least 20%, and/or a fat content of at most 8%; where the edible mycelium is derived from *Fusarium brachygibbosum*, for example, the edible mycelium is obtained by *Fusarium brachygibbosum* fermentation.

In the present disclosure, the edible mycelium has a protein content of preferably 45%, 50%, 55%, 60%, or 65% and above. The edible mycelium has a dietary fiber content of preferably 25%, 30%, 35%, 40%, or 45% and above. The edible mycelium has a fat content of preferably 7%, 6%, 5%, 4%, 3% or less.

In the present disclosure, the edible mycelium preferably includes a *Fusarium brachygibbosum* strain with a deposit number of CGMCC NO: 41066. The elasticity and toughness of the edible mycelium are improved by adding the multivitamin during the fermentation and culture.

In the present disclosure, the fermentation method is the same as that for producing an edible mycelium using *Fusarium brachygibbosum* as described in the above technical solution. The edible mycelium prepared by fermentation is preferably filamentous in appearance, flesh-colored, and elastic. Through physical and chemical tests, it is found that the protein-rich mycelium does not contain toxins, showing desirable safety for consumption.

Since the edible mycelium is rich in proteins, it can be used as a raw material for alternative protein and applied in industrial production. The present disclosure further provides use of the edible mycelium or an edible mycelium produced by the method in the preparation of a meat substitute.

In the present disclosure, the meat substitute, as a kind of edible mycelium-processed product, is a meat substitute prepared from the edible mycelium without structural processing, and includes nutritional food and health care products. The structural processing preferably includes shearing.

In the present disclosure, the method for preparing a meat substitute involves using protein-rich edible mycelium as a raw material for processing or deep processing to obtain various different products. The method for preparing the protein-rich mycelium into nutritious food preferably includes: directly using the protein-rich mycelium or extracting high purity protein and conducting combination with other excipients to prepare the nutritious food. Since the mycelium exhibits elasticity and toughness, and is rich in protein containing a variety of essential amino acids, the nutritional value of the prepared food products can be greatly improved. The food product is preferably presented in the form of a nutritional supplement. Similarly, food products can be formulated to enhance taste or to make the food product more appealing to consumers by combining same with ordinary foods. In certain embodiments, the composition of the present disclosure is formulated as a dairy-based product or a meat-based product. In an embodiment, the fermented edible mycelium is used to replace meat raw materials (pork, beef, chicken, fish, mutton, rabbit, and donkey meat) to prepare ham or sausage. The term "dairy-based product" means any liquid or semisolid milk- or whey-based product with varying fat content. The dairy-based product can be, for example, cow milk, goat milk, sheep milk, skim milk, whole milk, and milk reconstituted from milk powder and whey without any processing, or processed products such as acid curd, coagulated milk, curd, yogurt, acidified whole milk, butter milk, and other yogurt products. Another important group includes milk drinks such as whey drinks, fermented milk, condensed milk, baby or toddler milk; flavored milk, ice cream; milk-containing foods such as candies.

In the present disclosure, the method for preparing the protein-rich mycelium into a health product preferably includes: directly using or extracting high-purity protein from the protein-rich mycelium or conducting combination with other active ingredients and excipients to prepare the health product. The health product includes an acceptable excipient or carrier. Acceptable carriers or diluents for healthcare use are well known in the healthcare product art. For example, the carrier preferably includes any one or more of the following: lactose, starch, glucose, methylcellulose, magnesium stearate, mannitol, and sorbitol, or analogues thereof. The diluent preferably includes ethanol, glycerol, and water or other solvents. The pharmaceutical carrier, excipient, or diluent can be selected with regard to the intended route of administration and standard pharmaceutical/nutraceutical practice. The healthcare product may include any suitable binder, lubricant, suspending agent, coating agent, and solubilizer in addition to the carrier, excipient, or diluent. The binder includes: starch, gelatin, and natural sugars such as glucose, anhydrous lactose, free-flowing lactose, and β-lactose; corn sweeteners; natural and synthetic gums such as acacia, tragacanth or sodium alginate, carboxymethylcellulose, and polyethylene glycol. The lubricant includes sodium oleate, sodium stearate, magnesium stearate, sodium benzoate, sodium acetate, and sodium chloride. A preservative, stabilizer, dye, and even flavoring agent may be provided in the healthcare product. The preservative includes sodium benzoate, sorbic acid, cysteine, and esters of p-hydroxybenzoic acid. An antioxidant and a suspending agent may also be used. Another example of the suitable carrier is sucrose. Another example of the preservative is cysteine.

When used in conjunction with the term "comprising/including" in the claims and/or the description, the word "a" or "an" can mean "one", and can also mean "one or more", "at least one" and "one or more than one".

As used in the claims and description, the words "comprising," "having," "including," or "containing" are inclusive or open-ended and do not exclude additional, unrecited elements, or method and steps.

Although the present disclosure supports a definition of the term "or" as only alternatives as well as "and/or," the term "or" in the claims means "and/or" unless explicitly stated as only alternatives or the alternatives are mutually exclusive.

When used in the claims or specification, a selected/optional/preferred "numerical range" includes both the numerical endpoints at both ends of the range, as well as all natural numbers covered between the numerical endpoints relative to the aforementioned numerical endpoints.

The "edible mycelium" refers to a fermented culture or concentrate of a fungus, or an edible mycelium concentrate obtained by further dehydrating and removing nucleic acids from the fermented culture of the fungus. Furthermore, depending on the water content in the concentrate after dehydration, the edible mycelium can be in a solid form, or a solid-liquid mixture form.

The "mycelium" refers to the nutrient growth part of a fungus, which is composed of mycelium and is an important source of fungal protein. The mycelium in the present disclosure is derived from a fungus of the genus *Fusarium*, and the edible mycelium is obtained after the fungus is fermented. In some embodiments, the edible mycelium is derived from a fermented culture of a single fungus species. In some embodiments, the edible mycelium is derived from a combined fermentation culture of multiple types of fungi.

The use of *Fusarium brachygibbosum* in the production of mycelial protein provided by the present disclosure is described in detail below with reference to the examples, but these examples should not be construed as a limitation to the protection scope of the present disclosure.

Example 1

Separation and Screening Method of a *Fusarium brachygibbosum* Strain FXFB001

1. Strain Source 1.1 Sample collection: the strain FXFB001 was collected from a forest humus soil sample in Shannan City, Tibet Autonomous Region in June 2018.

1.2 Separation Process:

The forest humus soil sample was mixed well, and 5 g of the sample was weighed and placed in a triangular flask containing 45 mL of sterile 0.7% sodium carboxymethyl cellulose solution and 15 glass beads. It was shaken at 30° C. and 150 rpm for 30 min. 1 mL of an obtained soil suspension was diluted with sterile water in a series of concentration gradients of $10^{-1}$, $10^{-2}$, and $10^{-3}$. The two dilutions of $10^{-2}$ and $10^{-3}$ were spread on MGA 2.5 (containing chloramphenicol and tetracycline hydrochloride) plates at a drop volume of 100 μL/plate. The plate was spread evenly and incubated inverted at 28° C. for 2 d to 7 d after the surface of plate was dry. MGA 2.5 medium included the following components: 15 g/L peptone, 1.0 g $KH_2PO_4$, 0.5 g $MgSO_4 \cdot 7H_2O$, 0.0025 g malachite green oxalate, 20 g agar, and 1 L distilled water.

1.3 Purification Process:

The purification was conducted by adopting the tip culture method on the mycelia. After colonies were formed on the plate, the mycelium at the edge of a single colony were selected and placed on malt extract agar/malt extract agar medium (MEA, purchased from Beijing Aobox Biotech Co., Ltd.), and cultured at 28° C. until pure colonies were obtained. The pure colonies were stored at −80° C. and named strain FXFB001.

2. Strain Identification 2.1 Morphological Characteristics of Strain FXFB001

The strain FXFB001 was inoculated into MEA medium and cultured at 28° C. for 4 d. The strain was identified based on the growth rate, mycelium shape, colony color, the number and shape of small and large conidia, spore-forming cells, the shape and presence of thick-walled spores, and the type of fruiting body.

Culture characteristics: the colony had a diameter of 3.8 cm on day 4. The aerial mycelia grown on PSA medium were felt-like, white at first and then gradually turned pink. The back of the plate was orange-red to dark red (FIG. 1).

Morphological Characteristics:

Conidial morphology was as follows: large conidia were sickle-shaped, slightly pointed at both ends, with 3 to 5 septa, and measured (10.8-25.1) μm×(2.0-3.6) μm. The small conidia were fusiform, slightly curved, slightly flat at both ends, with 0 to 2 septa. The chlamydospores were spherical, solitary in the mycelium, and measured 5.2 μm to 7.5 μm.

2.2 Molecular Biological Identification of Strain FXFB001

2.2.1 TEF1 and ITS Sequence Analysis

1. Preparation of DNA Template

An appropriate amount of mycelium of the strain was taken into a polymerase chain reaction (PCR) tube containing 50 μL of lysis buffer, which was put into a PCR instrument (Dongsheng ETC811), heated at 95° C. for 30 min, and transferred to −20° C. to allow freezing for 15 min. The mycelia were taken out and placed in a centrifuge (SIGMA 3K15) at 3,000 rpm for 2 min to allow the cell debris and lysate to settle to a bottom of the PCR tube, while the supernatant was basically clarified. At this time, the fungal genetic material was dissolved in the supernatant.

2. Preparation of PCR System

A 25 μL of PCR system was prepared, including: 2 μL of supernatant, 8.8 μL of ultrapure sterile water, 12 μL of 2×PCR Mix, 1 μL of DMSO, 0.6 μL of 10 μmol/L upstream primer, and 0.6 μL of 10 μmol/L downstream primer. Primer sequences are shown in Table 1:

TABLE 1

Primer sequences for amplification of the two genes

| Gene | Forward primer (5'→3') | Reverse primer (5'→3') |
|---|---|---|
| TEF1 | ATGGGTAAGGARGACAAGAC (SEQ ID NO: 1) | GGARGTACCAGTSATCATG (SEQ ID NO: 2) |
| ITS1 | GGAAGTAAAAGTCGTAACAAGG (SEQ ID NO: 3) | GGTCCGTGTTTCAAGACGG (SEQ ID NO: 4) |

3. PCR Amplification

2 μL of the supernatant and the prepared PCR system were added into a PCR tube, placed in a PCR instrument (Dongsheng ETC811) to allow PCR amplification, where PCR reaction conditions are shown in the following table. After amplification, a resulting PCR product was sent to Beijing Tsingke Biotech Co., Ltd. for sequencing using a sequencer (abi3730XL).

The PCR Reaction Conditions are as Follows:

TEF1: initial denaturation at 94° C. for 3 min; denaturation at 94° C. for 30 s, annealing at 55° C. for 30 s, amplification at 72° C. for 1 min, 34 cycles; and maintaining at 72° C. for another 5 min.

ITS1: initial denaturation at 94° C. for 2.5 min; denaturation at 95° C. for 30 s, annealing at 52° C. for 30 s, amplification at 72° C. for 1 min, 30 cycles; and maintaining at 72° C. for another 5 min.

4. PCR Products were Sequenced and Resulting PCR Product Sequences are as Follows:

```
TEF1 sequence:
                                    (SEQ ID NO: 5)
GACTCTGGCAAGTCGACCACTGTAAGTACCACCAAGCCTCGACCCCGCC

TAGATTTGGTGGGGTAGTCTCAAGATTCATCCATACTGACATACTTTGA

TAGACCGGTCACTTGATCTACCAGTGCGGTGGTATCGACAAGCGAACCA

TCGAGAAGTTCGAGAAGGTTGGTCTCATTTCCCTCGATCGCGCGCCCTT

TTACCCATCGATCCATCATTCGACTCGCTCTCTCACGACGACTCGATCC

GCGCCCGTTACCCCGCTCGAGCTCAAAAATTTTGCGAATCAATCGTAAT

TTTTTTCTTGATGGGGCTCATACCCCGCCACTCGAGTGACGGGCGCGCT

TGCCCTCTTCCCACAGTCATATTCATATGGGCGCGCATCATCACGTGTC

TACCAGTCACTAACCACTTGACAATAGGAAGCCGCCGAGCTCGGTAAGG

GTTCCTTCAAGTACGCCTGGGTTCTTGACAAGCTCAAGGCCGAGCGTGA

GCGTGGTATCACCATTGATATCGCTCTCTGGAAGTTCGAGACTCCTCGC

TACTATGTCACCGTCATTGGTATGCTGTCACCGTTGCCTTCATCACATC

CTCATACTAACACGTCCACCAGAC.

ITS1 sequence:
                                    (SEQ ID NO: 6)
CCGAGTTTACAACTCCCAAACCCCTGTGAACATACCTTTATGTTGCCTC

GGCGGATCAGCCCGCGCCCCGTAAAACGGGACGGCCCGCCGCAGGAACC

ACAAAACTCTGATTTTAGTGTAACTTCTGAGTCTAAAAAACAAATAAAT

CAAAACTTTCAACAACGGATCTCTTGGTTCTGGCATCGATGAAGAACGC

AGCAAAATGCGATAAGTAATGTGAATTGCAGAATTCAGTGAATCATCGA

ATCTTTGAACGCACATTGCGCCCGCCAGTATTCTGGCGGGCATGCCTGT

TCGAGCGTCATTTCAACCCTCAAGCCCCCGGGTTTGGTGTTGGGGATCG

GGCTGTACTCCAGCCCGGCCCCGAAATCTAGTGGCGGTCTCGCTGCAGC

CTCCATTGCGTAGTAGCTAACACCTCGCAACTGGAACGCGGCGCGGCCA

AGCCGTTAAACCCCCAACTTCTGAATGTTGACCTCGGATCAGGTAGGAA

TACCCGCTGAACTTAAGCATATCAATAAGCGGAGGAAAAGAAACCAACA

GGGATTGCCCTAGTAACGGCGAGTGAAGCGGCAACAGCTCAAATTTGAA

ATCTGGCTCTCGGGCCCGAGTTGTAATTTGTAGAGGATGCTTTTGATGC

GGTGCCTTCCGAGTTCCCTGGAACGGGACGCCATAGAGGGTGAGAGCCC

CGTCTGGTTGGATGCCAAATCTCTGTAAAGCTCCTTCGACGAGTCGAGT

AGTTTGGGAATGCTGCTCTAAATGGGAGGTATATGTCTTCTAAAGCTAA

ATACCGGCCAGAGACCGATAGCGCACAAGTAGAGTGATCGAAAGATGAA

AAGCACTTTGAAAAGAGAGTTAAAAAGTACGTGAAATTGTTGAAAGGGA

AGCGTTTATGACCAGACTTGGGCTTGGTTAATCATCTGGGGTTCTCCCC

AGTGCACTTTTCCAGTCCAGGCCAGCATCAGTTTTCGCCGGGGGATAAA
```

-continued

```
GGCTTCGGGAATGTGGCTCCCTCCGGGGAGTGTTATAGCCCGTTGCGTA

ATACCCTGGCGGGGACTGAGGTTCGCGCTTCTGCAA.
```

The two gene sequences were aligned using an NBCI online alignment system (Blast) and the alignment database was the Nucleotide collection (nr/nt). The best hits of the two genes after alignment are shown in Table 2.

TABLE 2

Alignment results for two gene sequences of strain

| Gene | NCBI accession number | Latin | Sequence homology | Query Cover | E value |
|---|---|---|---|---|---|
| TEF1 | MK752485.1 | *Fusarium brachygibbosum* | 99.84% | 100% | 0 |
| ITS1 | GQ505450.1 | *Fusarium brachygibbosum* | 100% | 100% | 0 |

The sequences of TEF1 gene and ITS1 gene of all FSAMSC strains were collected from FUSARIOID-ID database (www.fusarium.org). The evolutionary position of the current strain was analyzed by constructing a multi-gene polygenetic tree.

Figure 2:
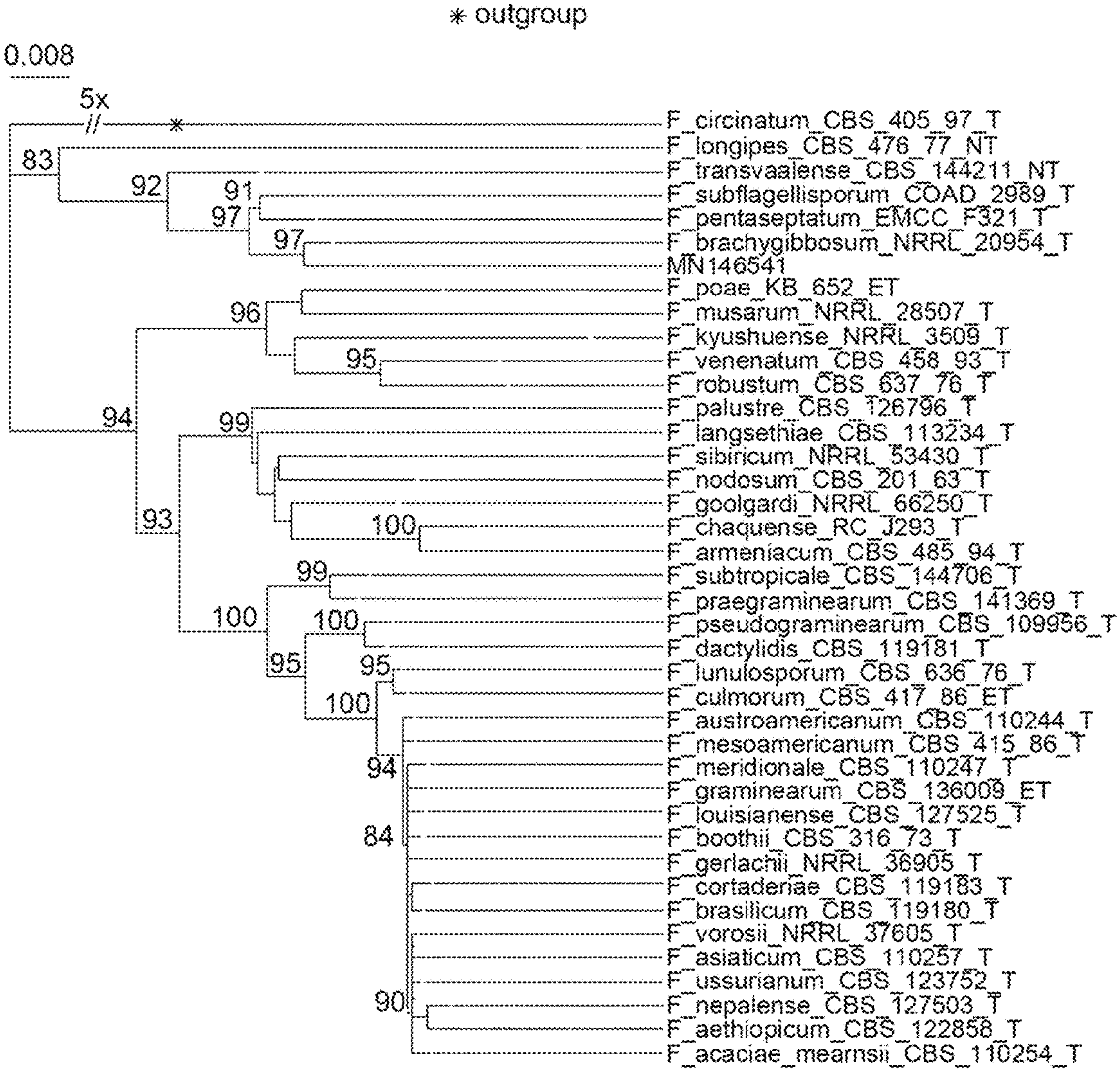
FIG. 2 shows a phylogenetic tree of the strain FXFB001 constructed based on multiple genes in Example 1 of the present disclosure.

Multi-gene polygenetic tree analysis: MAFFT (version v7.310) was used to conduct multiple sequence alignment for each gene, and GBLOCKS (version 0.91b) was used to trim the multiple sequence alignment result file. AliView was used for manual trimming. After the trimming, the sequences of the two genes were concatenated, and the multi-gene joint phylogenetic tree was constructed using IQ-TREE (version 2.2.5) for the concatenated sequences, as shown in FIG. 2.

Based on the morphological characteristics and ITS1 and TEF1 sequence analysis, the strain FXFB001 was identified as *Fusarium brachygibbosum*. The strain was deposited in CGMCC on Dec. 13, 2023, with a deposit number of CGMCC NO: 41066.

Example 2

Experiment of Preliminary Screening of Strain Producing Mycelial Protein

1. Method for Preliminary Screening of Strain Producing Mycelial Protein

The strain FXFB001 isolated and identified in Example 1 and other microbial strains isolated from the same batch as the strain FXFB001 were inoculated into 250 mL triple-concave Erlenmeyer flasks filled with 50 mL of primary screening medium, and then cultured at a constant temperature and 200 rpm for 48 h. The primary screening medium included 30 g/L glucose, 30 g/L yeast extract powder, 1 g/L $KH_2PO_4$, 0.5 g/L $MgSO_4 \cdot 7H_2O$, and 0.2 g/L $CaCl_2$), and was sterilized by high-pressure steam at 121° C. for 20 min.

The sample was filtered with a vacuum filtration device and a resulting filter cake was fully washed and placed in an electric blast drying oven at 60° C. for drying. The mass of the dried filter cake was accurately weighed and the biomass concentration was calculated. Then, the crude protein of mycelium was determined by the Kjeldahl method in accordance with GB 5009.5-2016 “National Food Safety Standard-Determination of Protein in Foods”.

2. The results of the initial screening of prepared mycelium are shown in Table 3.

TABLE 3

Overview of mycelium produced by initial screening of strain

| Strain SN | Seed shape | Seed filter cake color | Fermentation shape | Fermentation filter cake color | Filter cake elasticity | Biomass (DCW/50 mL) | Crude protein content (%) | Evaluation result | Evaluation reason |
|---|---|---|---|---|---|---|---|---|---|
| 1 | Powder-like | Red-orange | Powder-like | Red-orange | No elasticity | 0.995 | 43.72 | Unqualified | Mycelium morphology unqualified |
| 2 | Powder-like | Red-orange | Powder-like | Red-orange | No elasticity | 0.52 | 46.49 | Unqualified | Mycelium morphology unqualified |
| 3 | Particle | Red-orange | Particle | Red-orange | No elasticity | 0 | 0.00 | Unqualified | Mycelium morphology unqualified |
| 4 | Filamentous | Red-orange | Filamentous | Red-orange | High elasticity | 1.01 | 44.05 | Unqualified | Low crude protein |
| 5 | Filamentous | Red-orange | Filamentous | Red-orange | Elasticity | 0.91 | 47.42 | Unqualified | Low crude protein |
| 6 | Powder-like | Red-orange | Powder-like | Red-orange | No elasticity | 0.935 | 47.93 | Unqualified | Mycelium morphology unqualified |
| 7 | Filamentous | Red-orange | Filamentous | Red-orange | High elasticity | 0.88 | 36.90 | Unqualified | Low crude protein |
| 8 | Filamentous | Red-orange | Filamentous | Red-orange | No elasticity | 0.89 | 48.32 | Unqualified | Bad filter cake texture and low crude protein |
| 9 | Filamentous | Red-orange | Filamentous | Red-orange | Elasticity | 0.77 | 43.72 | Unqualified | Low crude protein |
| 10 | Filamentous | Red-orange | Filamentous | Red-orange | Elasticity | 0.95 | 46.50 | Unqualified | Low crude protein |
| 11 | Powder-like | Red-orange | Powder-like | Red-orange | No elasticity | 0.81 | 49.75 | Unqualified | Bad mycelium morphology and low crude protein |
| 12 | Particle | Red-orange | Particle | Red-orange | No elasticity | 0.56 | 47.89 | Unqualified | Mycelium morphology unqualified |
| 13 | Filamentous | Red-orange | Filamentous | Red-orange | Elasticity | 1 | 45.92 | Unqualified | Low crude protein |
| 14 | Powder-like | Red-orange | Powder-like | Red-orange | No elasticity | 0.615 | 51.03 | Unqualified | Mycelium morphology unqualified |
| 15 | Powder-like | Red-orange | Powder-like | Red-orange | No elasticity | 0.66 | 45.11 | Unqualified | Mycelium morphology unqualified |
| 16 | Filamentous | Red-orange | Filamentous | Red-orange | High elasticity | 0.97 | 47.32 | Unqualified | Low crude protein |
| 17 | Powder-like | Red-orange | Powder-like | Red-orange | No elasticity | 0.535 | 48.60 | Unqualified | Bad mycelium morphology and low crude protein |
| 18 | Filamentous | Red-orange | Filamentous | Red-orange | No elasticity | 0.96 | 45.97 | Unqualified | Low crude protein |
| 19 | Filamentous | Red-orange | Filamentous | Red-orange | No elasticity | 0.86 | 42.40 | Unqualified | Low crude protein |
| 20 | Filamentous | Red-orange | Filamentous | Red-orange | Elasticity | 1.03 | 42.01 | Unqualified | Low crude protein |
| 21 | Filamentous | Red-orange | Filamentous | Red-orange | Elasticity | 0.71 | 45.97 | Unqualified | Low crude protein |
| 22 | Filamentous | Red-orange | Filamentous | Red-orange | High elasticity | 0.48 | 50.08 | Good | All indicators were desirable |
| 23 | Filamentous | Red-orange | Filamentous | Red-orange | Elasticity | 0.82 | 44.80 | Unqualified | Low crude protein |
| 24 | Filamentous | Red-orange | Filamentous | Red-orange | Elasticity | 0.74 | 45.39 | Unqualified | Low crude protein |
| 25 | Powder-like | Red-orange | Powder-like | Red-orange | Slime-shape | 0.71 | 47.94 | Unqualified | Mycelium morphology unqualified |
| 26 | Powder-like | Red-orange | Powder-like | Red-orange | Slime-shape | 0.94 | 47.53 | Unqualified | Mycelium morphology unqualified |
| 27 | Particle | Red-orange | Particle | Red-orange | No elasticity | 1.01 | 49.30 | Unqualified | Bad mycelium morphology and low crude protein |
| 28 | Powder-like | Red-orange | Powder-like | Red-orange | No elasticity | 0.94 | 46.55 | Unqualified | Mycelium morphology unqualified |
| 29 | Powder-like | Red-orange | Powder-like | Red-orange | No elasticity | 1 | 46.24 | Unqualified | Mycelium morphology unqualified |
| 30 | Powder-like | Red-orange | Powder-like | Red-orange | Slime-shape | 0.92 | 46.35 | Unqualified | Mycelium morphology unqualified |
| 31 | Particle | Red-orange | Particle | Red-orange | No elasticity | 0.24 | 46.14 | Unqualified | Mycelium morphology unqualified |
| 32 | Particle | Red-orange | Particle | Red-orange | No elasticity | 0 | 0.00 | Unqualified | Mycelium morphology unqualified |
| 33 | Filamentous | Red-orange | Filamentous | Red-orange | Elasticity | 0.71 | 49.43 | Unqualified | Low crude protein |
| 34 | Filamentous | Red-orange | Filamentous | Red-orange | High elasticity | 0.37 | 48.23 | OK | Lower crude protein and better filter cake texture |
| 35 | Powder-like | Red-orange | Powder-like | Red-orange | No elasticity | 0 | 0.00 | Unqualified | Mycelium morphology unqualified |
| 36 | Powder-like | Red-orange | Powder-like | Red-orange | No elasticity | 0 | 0.00 | Unqualified | Mycelium morphology unqualified |

TABLE 3-continued

| Overview of mycelium produced by initial screening of strain | | | | | | | | | | |
|---|---|---|---|---|---|---|---|---|---|---|
| Strain SN | Seed shape | Seed filter cake color | Fermentation shape | Fermentation filter cake color | Filter cake elasticity | Biomass (DCW/50 mL) | Crude protein content (%) | Evaluation result | Evaluation reason |
| 37 | Powder-like | Red-orange | Powder-like | Red-orange | No elasticity | 0 | 0.00 | Unqualified | Mycelium morphology unqualified |
| 38 | Filamentous | Red-orange | Filamentous | Red-orange | High elasticity | 0.56 | 47.53 | Unqualified | Mycelium morphology unqualified |
| 39 | Filamentous + spherical | Red-orange | Filamentous + spherical | Red-orange | High elasticity | 0.31 | 46.00 | Unqualified | Low crude protein |
| 40 | Filamentous | Red-orange | Filamentous | Red-orange | High elasticity | 0.58 | 51.64 | Good | All indicators were desirable |
| 41 | Filamentous | Pale yellow | Filamentous | Pale yellow | Elasticity | 0.63 | 55.39 | Excellent | Extremely high crude protein and desirable other indicators |

NOTE:
Biomass (%) = mycelium dry weight/medium volume × 100%;
Protein content (%) = (crude protein mass/total mass of bacteria) × 100%.

Figure 3:
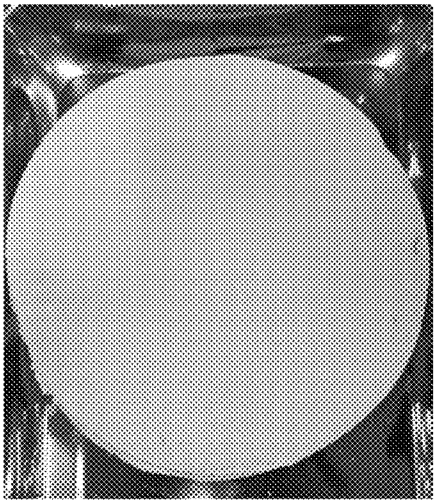
FIG. 3 shows a bacterial cake obtained by preliminary screening and culturing of the strain FXFB001 in Example 2 of the present disclosure.

The strain numbered 41 was the strain FXFB001. The mycelia prepared by fermentation of the strain FXFB001 had a filamentous mycelium appearance, a light yellow filter cake, and an elastic filter cake texture (FIG. 3), with a dry weight biomass of 0.63%. The mycelial protein content was further determined by the Kjeldahl method to be 55.39%. In conclusion, the protein-rich mycelium prepared by the strain FXFB001 was free of spores under microscopic examination, had excellent filamentous shape, light yellow filter cake, good elasticity, and no unpleasant odor.

Example 3

Amplification and Fermentation of the Strain FXFB001 and Several Microbial Strains Obtained from Primary Screening and Culture Thereof to Produce Mycelium 1. Culture Method 1.1 The compositions of seed media in shake flasks are shown in Table 4 (seed medium for primary seed culture and secondary seed culture) and Table 5 (seed medium for tertiary seed culture).

TABLE 4

| Media for primary seed culture and secondary seed culture | |
|---|---|
| Component | Content |
| Glucose | 30 g/L |
| Yeast extract powder | 25 g/L |
| Potassium dihydrogen phosphate | 1 g/L |
| Magnesium sulfate heptahydrate | 0.2 g/L |
| Calcium chloride | 0.01 g/L |

TABLE 5

| Seed medium for tertiary seed culture | |
|---|---|
| Component | Content |
| Corn starch | 25 g/L |
| Citric acid | 1 g/L |
| Potassium dihydrogen phosphate | 1 g/L |
| Ammonium sulfate | 5 g/L |
| Magnesium sulfate | 0.2 g/L |

TABLE 5-continued

| Seed medium for tertiary seed culture | |
|---|---|
| Component | Content |
| heptahydrate | |
| Calcium chloride | 0.01 g/L |
| Manganese sulfate monohydrate | 1.7 mg/L |
| Ferrous sulfate heptahydrate | 5 mg/L |
| Zinc chloride | 1.7 mg/L |
| Cobalt chloride | 2 mg/L |

1.2 Seed liquid culture conditions: the primary seed liquid was prepared using the seed medium in Table 4, and the activated strain (strains with desirable mycelial morphology and various indicators in seed liquid and fermentation broth were selected, as shown in Table 7) of the present disclosure was picked and inoculated into a 250 mL triple-concave Erlenmeyer flask containing 50 mL of primary screening medium, and cultured at a constant temperature and 200 rpm for 24 h. The secondary seed liquid was prepared with the seed medium in Table 4, and transferred into a 3 L triple-concave Erlenmeyer flask containing 1 L seed medium at a 5% inoculation amount, and cultured in a shaker at 200 rpm for 24 h. According to the inoculation amount of 8%, the secondary seed liquid was inoculated into a 10 L fermentation vessel containing the seed medium shown in Table 5. The fermentation was conducted for about 24 h at a ventilation rate of 10 L/min, a vessel pressure of 0.05 MPa, a stirring speed of 150 rpm, a temperature of 28° C., and the pH was adjusted to 5 online using ammonia solution.

1.3 Fermentation Culture to Produce Protein-Rich Mycelium:

1.3.1 The composition of the fermentation medium 1 for producing protein-rich mycelium is shown in Table 6.

TABLE 6

| Fermentation medium 1 | |
|---|---|
| Component | Content |
| Corn starch | 25 g/L |
| Citric acid | 1 g/L |
| Potassium dihydrogen | 1 g/L |

TABLE 6-continued

| Fermentation medium 1 | |
|---|---|
| Component | Content |
| phosphate | |
| Ammonium sulfate | 5 g/L |
| Magnesium sulfate heptahydrate | 0.2 g/L |
| calcium chloride | 0.01 g/L |
| Manganese sulfate monohydrate | 1.7 mg/L |
| Ferrous sulfate heptahydrate | 5 mg/L |
| Zinc chloride | 1.7 mg/L |
| Cobalt chloride | 2 mg/L |
| Multivitamin | 0.1 mg/L |

The multivitamin used in this example included the following components in equal mass ratios: vitamin $B_1$/thiamine, vitamin $B_{12}$/cobalamin, vitamin $B_2$/riboflavin, vitamin $B_3$/niacin, vitamin $B_5$/D-calcium pantothenate, vitamin $B_6$/pyridoxine, vitamin $B_9$/folic acid, vitamin C, and vitamin H/D-biotin.

1.4 Fermentation Culture Method:

According to an inoculation amount of 5%, the tertiary seed liquid cultured for 24 h was pumped into a 50 L fermentation vessel with a liquid volume of 30 L through a sterilized hose from the bottom valve; the ventilation rate for the first 15 h was 1,000 L/h, and the vessel pressure was 0.05 MPa; after 15 h, feeding was started at 0.5 mL/L/h, where the feeding components included 300 g/L glucose and 0.1 mg/L multivitamin, and the ventilation was adjusted to 1,500 L/h and the vessel pressure was 0.1 MPa; the pH value was controlled at 6.0 with ammonia solution; the culture was conducted at 28° C. and 100 rpm with a dissolved oxygen rate of 50% for 72 h.

1.5 Post-Treatment of Fermentation Culture

1) Heat treatment: after fermentation, the fermentation broth was heated to 65° C. and kept for about 20 min, then heated to 90° C. and kept for about 10 min, and then cooled to room temperature.

2) Filter pressing and refrigeration: the fermentation broth after heat treatment was filtered by a plate and frame filter press. After sufficient washing and ventilation, a filter cake was taken out and stored at 4° C.

3) Detection: samples for crude protein determination were pretreated, dried, crushed, and passed through a 60-mesh sieve, and then determined in accordance with "GB5009.5-2016 National Food Safety Standard-Determination of Protein in Foods". The detection of common fungal toxins in food was sent to a third party, SGS, for testing.

The fermentation results of each strain were shown in Table 7.

TABLE 7

Results for re-screening of *Fusarium* in 50 L fermentation vessel

| | Strain SN | Fermentation time | Filter cake color | Filter cake elasticity | Unpleasant odor | Mycelium morphology | Mycelium length | Mycelium diameter | Mycelium branch |
|---|---|---|---|---|---|---|---|---|---|
| 22 | 20230500 | 65 | Yellow-gray | | None | Filamentous | Relatively short | Fine | Many |
| 34 | 20231029 | 40 | Earthy yellow | Fragile | Foul | Filamentous | Extremely short | Moderate | Many |
| 40 | 20230602 | 75.5 | Pale yellow | Elasticity | None | Branch-shape | Relatively short | Fine | Great number |
| 41 | 20230519 | 75.6 | Pale yellow | High elasticity | No unpleasant odor | Filamentous | Long | Fine | Few |

| | Strain SN | Spores | Crude protein content | Evaluation result | Evaluation reason |
|---|---|---|---|---|---|
| 22 | 20230500 | Great number | 54.09 | Unqualified | Short mycelium with many branches |
| 34 | 20231029 | None | Non-detected | Unqualified | Inappropriate color, texture, or smell |
| 40 | 20230602 | Many | 44.68 | Unqualified | Low crude protein and poor mycelium morphology |
| 41 | 20230519 | Few | 54.61 | Qualified | High protein content, desirable mycelium morphology, no other obvious adverse characteristics |

Comparison of the mycelium obtained by fermenting the *Fusarium brachygibbosum* strain FXFB001 in the fermentation medium 1 supplemented with multivitamin with the protein-rich mycelium prepared by preliminary screening in Example 2:

1. The mycelium prepared by preliminary screening was examined under a microscope and found to be spore-free, with a grayish white filter cake, desirable elasticity and toughness, and no bad odor.

Figure 4:
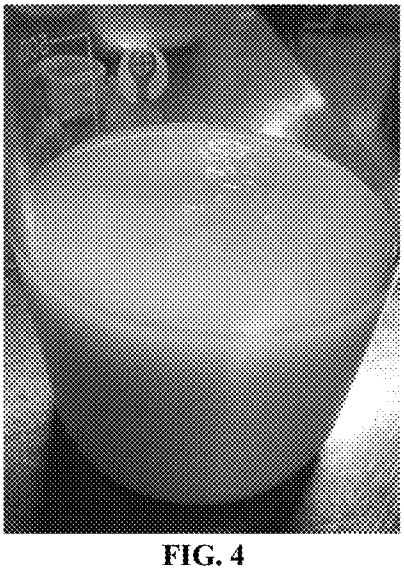
FIG. 4 shows a fermentation product obtained by fermenting the strain FXFB001 in Example 3 of the present disclosure.
Figure 5:
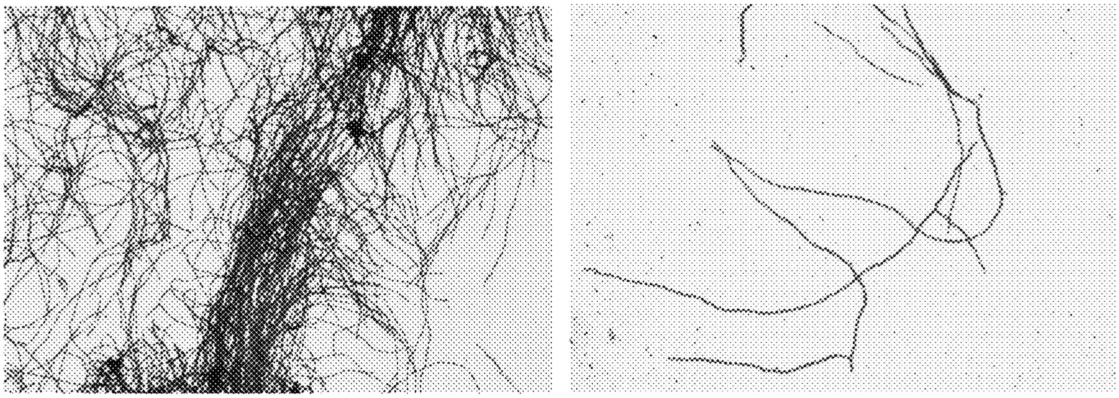
FIG. 5 shows protein-rich mycelia obtained by fermentation culture of the strain FXFB001 observed under a microscope in Example 3 of the present disclosure.

2. The mycelial protein obtained by continuous fermentation culture had desirable filaments under microscopic examination (FIG. 4 and FIG. 5), allowing the fermentation broth to naturally present a meat-like color without heating; the protein content was about 55%.

From the toxin detection results, it was seen that under the above fermentation and culture conditions, the strain FXFB001 did not contain detectable fungal toxins (below the limit, Table 8, and the detection method referred to the SN/T3136-2012 standard), the total fat content was 7.97%, the crude protein content was 60.51%, and the dietary fiber content was 26.01%.

TABLE 8

Overview of physical and chemical test results

| SN | Test item | Unit | Detection method | Test results 3 | Limit of quantification |
|---|---|---|---|---|---|
| 1 | Total fat | g/100 g | AOAC 996.06 | 2.2 | 0.01 |
| 2 | #Protein | g/100 g | AOAC979.09 | 16.7 | — |
| 3 | Dietary fiber | g/100 g | AOAC 991.43 | 7.18 | — |
| 4 | #Deoxynivalenol | μg/kg | GB 5009.111-2016 first method | ND | 20 |
| 5 | #3-acetyldeoxynivalenol | μg/kg | GB 5009.111-2016 first method | ND | 20 |
| 6 | #15-acetyldeoxynivalenol | μg/kg | GB 5009.111-2016 first method | ND | 20 |
| 7 | #Aflatoxin B1 | μg/kg | GB 5009.111-2016 first method | ND | 0.5 |
| 8 | #Aflatoxin B2 | μg/kg | SN/T 3136-2012 | ND | 1 |
| 9 | #Aflatoxin G1 | μg/kg | SN/T 3136-2012 | ND | 1 |
| 10 | #Aflatoxin G2 | | SN/T 3136-2012 | ND | 1 |
| 11 | #Aflatoxin B1 + aflatoxin B2 + aflatoxin G1 + aflatoxin G2 | μg/kg | SN/T 3136-2012 | ND | — |
| 12 | #Ochratoxin A | μg/kg | SN/T 3136-2012 | ND | 2 |
| 13 | #Fumonisin B1 | μg/kg | SN/T 3136-2012 | ND | 20 |
| 14 | #T-2 toxin | μg/kg | SN/T 3136-2012 | ND | 10 |
| 15 | #HT-2 toxin | μg/kg | SN/T 3136-2012 | ND | 10 |
| 16 | #Fumonisin B2 | μg/kg | SN/T 3136-2012 | ND | 20 |
| 17 | #Zearalenone | μg/kg | SN/T 3136-2012 | ND | 10 |
| 18 | #Fumonisin B3 | μg/kg | SN/T 3136-2012 | ND | 20 |
| 19 | #Sum of HT-2 toxin and T-2 toxin | μg/kg | SN/T 3136-2012 | ND | — |
| 10 | #Moisture | g/100 g | AOAC 925.45 | 72.4 | — |

Example 4

Method for Producing Protein-Rich Mycelium by Fermenting *Fusarium Brachygibbosum*

1. Culture Method 1.1 The compositions of seed media in shake flasks are shown in Table 8 (seed medium for primary seed culture and secondary seed culture) and Table 9 (seed medium for tertiary seed culture).

TABLE 8

Media for primary seed culture and secondary seed culture

| Component | Content |
|---|---|
| Glucose | 28 g/L |
| Yeast extract powder | 27 g/L |
| Potassium dihydrogen phosphate | 1.2 g/L |
| Magnesium sulfate heptahydrate | 0.18 g/L |
| Calcium sulfate | 0.0122 g/L |

TABLE 9

Seed medium for tertiary seed culture

| Component | Content |
|---|---|
| Sweet potato starch | 24 g/L |
| Citric acid | 1.1 g/L |
| Potassium dihydrogen phosphate | 1.1 g/L |

TABLE 9-continued

Seed medium for tertiary seed culture

| Component | Content |
|---|---|
| Ammonium sulfate | 4.8 g/L |
| Magnesium sulfate heptahydrate | 0.18 g/L |
| calcium chloride | 0.008 g/L |
| Manganese sulfate monohydrate | 1.5 mg/L |
| Ferrous sulfate heptahydrate | 5 mg/L |
| Zinc Sulfate | 2.01 mg/L |
| Cobalt chloride | 2.2 mg/L |

1.2 Seed liquid culture conditions: the primary seed liquid was prepared using the seed medium shown in Table 8, and the activated strain FXFB001 was selected and inoculated into a 250 mL triple-concave Erlenmeyer flask containing 50 mL of the medium, and cultured at a constant temperature and 180 rpm for 26 h. The secondary seed liquid was prepared with the seed medium in Table 8, and transferred into a 3 L triple-concave Erlenmeyer flask containing 1 L seed medium at a 6% inoculation amount, and cultured in a shaker at 220 rpm for 22 h. According to an inoculation amount of 10%, the secondary seed liquid was inoculated into a 10 L fermentation vessel containing the seed medium shown in Table 9. The fermentation was conducted for about 36 h at a ventilation rate of 11 L/min, a vessel pressure of 0.06 MPa, a stirring speed of 220 rpm, a temperature of 26° C., and the pH was adjusted online to 6 using ammonia solution.

1.3 Fermentation Culture to Produce Protein-Rich Mycelium:

1.3.1 The composition of fermentation medium for producing protein-rich mycelium is shown in Table 10.

TABLE 10

| Fermentation medium 2 | |
|---|---|
| Component | Content (kg/m$^3$) |
| Glucose | 40 |
| Potassium sulfate | 1 |
| H3PO4 | 0.5 |
| Magnesium sulfate heptahydrate | 0.2 |
| Zinc sulfate heptahydrate | 0.05 |
| Manganese sulfate tetrahydrate | 0.02 |
| Calcium acetate | 0.2 |
| Defoamer | 0.1 |

1.4 Fermentation Culture Method:

According to an inoculation amount of 7%, the tertiary seed liquid cultured for 22 h was pumped into a 50 L fermentation vessel with 30 L of fermentation medium 2 shown in Table 10 through a sterilized hose from the bottom valve; the ventilation rate was 1,100 L/h, and the vessel pressure was 0.05 MPa. When the reducing sugar in the fermentation medium was lower than 2 g/L, 80% of the medium was discharged and then the feeding component was added to the original volume within 20 min. The feed medium was fermentation medium 2, and the ventilation rate was adjusted to 1,400 L/h and the vessel pressure was 0.1 MPa; the pH value was controlled at 5.2 with ammonia solution. The culture was conducted at 28° C. and 350 rpm with dissolved oxygen of 40% for 480 h.

1.5 Post-Treatment of Fermentation Culture

1) Heat treatment: after fermentation, the fermentation broth was heated to 65° C. and kept for about 20 min, then heated to 90° C. and kept for about 10 min, and then cooled to room temperature.

2) Filter pressing and refrigeration: the fermentation broth after heat treatment was filtered by a plate and frame filter press. After sufficient washing and ventilation, a filter cake was taken out and stored at 4° C.

3) Detection: samples for crude protein determination were pretreated, dried, crushed, and passed through a 60-mesh sieve, and then determined in accordance with "GB5009.5-2016 National Food Safety Standard-Determination of Protein in Foods". The detection of common fungal toxins in food was performed a third party, SGS, for testing.

Under the above fermentation culture conditions, no toxins were detected in the mycelium produced by the strain FXFB001. By dry mass, the total fat content was 5.8%, the crude protein content was 54.2%, and the dietary fiber content was 20.4%.

Example 5

1. Culture Method 1.1 The compositions of the seed media in shake flask are shown in Table 11 (seed medium for primary seed culture and secondary seed culture) and Table 12 (seed medium for tertiary seed culture).

TABLE 11

| Media for primary seed culture and secondary seed culture | |
|---|---|
| Component | Content |
| Glucose | 30 g/L |
| Yeast extract powder | 25 g/L |
| Potassium dihydrogen phosphate | 1 g/L |
| Magnesium sulfate heptahydrate | 0.2 g/L |
| calcium chloride | 0.01 g/L |

TABLE 12

| Seed medium for tertiary seed culture | |
|---|---|
| Component | Content |
| Corn starch | 25 g/L |
| Citric acid | 1.2 g/L |
| Potassium dihydrogen phosphate | 0.8 g/L |
| Ammonium sulfate | 4.8 g/L |
| Magnesium sulfate heptahydrate | 0.18 g/L |
| calcium chloride | 0.01 g/L |
| Manganese sulfate monohydrate | 1.9 mg/L |
| Ferrous sulfate heptahydrate | 4.8 mg/L |
| Zinc chloride | 1.6 mg/L |
| Cobalt chloride | 1.8 mg/L |

1.2 Seed liquid culture conditions: the primary seed liquid was prepared using the seed medium shown in Table 11, and the activated strain FXFB001 was selected and inoculated into a 250 mL triple-concave Erlenmeyer flask containing 50 mL of the medium, and cultured at a constant temperature and 200 rpm for 24 h. The secondary seed liquid was prepared with the seed medium in Table 11, and transferred into a 3 L triple-concave Erlenmeyer flask containing 1 L seed medium at a 5% inoculation amount, and cultured in a shaker at 200 rpm for 24 h; according to the inoculation amount of 8%, the secondary seed liquid was inoculated into a fermentation vessel with a liquid volume of 10 L and the seed medium shown in Table 12, and the fermentation was conducted for about 24 h at a ventilation rate of 10 L/min, a vessel pressure of 0.05 MPa, a stirring speed of 150 rpm, a temperature of 27° C., and an online ammonia solution to adjust a pH value to 5.5.

1.3 Fermentation Culture to Produce Protein-Rich Mycelium:

1.3.1 The fermentation medium for producing protein-rich mycelium was shown in Table 13.

TABLE 13

| Fermentation medium 1 | |
|---|---|
| Component | Content |
| Potato starch | 24 g/L |
| Citric acid | 1 g/L |
| Potassium dihydrogen phosphate | 1 g/L |
| Ammonium sulfate | 5 g/L |
| Magnesium sulfate heptahydrate | 0.2 g/L |
| calcium chloride | 0.008 g/L |
| Manganese sulfate monohydrate | 1.7 mg/L |

TABLE 13-continued

| Fermentation medium 1 | |
|---|---|
| Component | Content |
| Ferrous sulfate heptahydrate | 5 mg/L |
| Zinc chloride | 1.7 mg/L |
| Cobalt chloride | 1.8 mg/L |
| Multivitamin | 0.1 mg/L |

The multivitamin included vitamins in the following mass ratios: vitamin $B_1$/thiamine 0.1 mg, vitamin $B_{12}$/cobalamin 0.1 mg, vitamin $B_2$/riboflavin 0.1 mg, vitamin $B_3$/niacin 0.1 mg, vitamin $B_5$/D-calcium pantothenate 0.1 mg, vitamin $B_6$/pyridoxine 0.1 mg, vitamin $B_9$/folic acid 0.1 mg, vitamin C 0.1 mg, and vitamin H/D-biotin 0.1 mg.

1.4 Fermentation Culture Method:

According to the inoculation amount of 10%, the tertiary seed liquid cultured for 24 h was pumped into a 50 L fermentation vessel with the fermentation medium 1 of 25 L shown in Table 13 through a sterilized hose from the bottom valve; the ventilation rate for the first 15 h was 900 L/h, and the vessel pressure was 0.04 MPa; after 15 h, feeding was started at 2 mL/L/h, where the feeding components included 300 g/L glucose and 0.1 mg/L multivitamin, and the ventilation was adjusted to 1,600 L/h and the vessel pressure was 0.1 MPa; the pH value was controlled at 4.5 with ammonia water; the culture was conducted at 28° C. and 100 rpm with a dissolved oxygen rate of 30% for 70 h.

1.5 Post-Treatment of Fermentation Culture

1) Heat treatment: after fermentation, the fermentation broth was heated to 65° C. and kept for about 20 min, then heated to 90° C. and kept for about 10 min, and then cooled to room temperature.

2) Filter pressing and refrigeration: the fermentation broth after heat treatment was filtered by a plate and frame filter press. After sufficient washing and ventilation, a filter cake was taken out and stored at 4° C.

3) Detection: samples for crude protein determination were pretreated, dried and crushed, and passed through a 60-mesh sieve, and then determined in accordance with "GB5009.5-2016 National Food Safety Standard-Determination of Protein in Foods". The detection of common fungal toxins in food was performed by a third party, SGS.

Under the above fermentation culture conditions, no toxins were detected in the mycelium produced by the strain FXFB001. By dry mass, the total fat content was 8%, the crude protein content was 60.5%, and the dietary fiber content was 26.0%.

Example 6

A Method for Producing Protein-Rich Mycelium by Fermenting *Fusarium Brachygibbosum*

1. Culture Method 1.1 The compositions of the seed media in shake flask are shown in Table 14 (seed medium for primary seed culture and secondary seed culture) and Table 15 (seed medium for tertiary seed culture).

TABLE 14

| Media for primary seed culture and secondary seed culture | |
|---|---|
| Component | Content |
| Glucose | 28 g/L |
| Yeast extract powder | 27 g/L |

TABLE 14-continued

| Media for primary seed culture and secondary seed culture | |
|---|---|
| Component | Content |
| Potassium dihydrogen phosphate | 1.2 g/L |
| Magnesium sulfate heptahydrate | 0.18 g/L |
| Calcium sulfate | 0.0122 g/L |

TABLE 15

| Seed medium for tertiary seed culture | |
|---|---|
| Component | Content |
| Sweet potato starch | 24 g/L |
| Citric acid | 1.1 g/L |
| Potassium dihydrogen phosphate | 1.1 g/L |
| Ammonium sulfate | 4.8 g/L |
| Magnesium sulfate heptahydrate | 0.18 g/L |
| calcium chloride | 0.008 g/L |
| Manganese sulfate monohydrate | 1.5 mg/L |
| Ferrous sulfate heptahydrate | 5 mg/L |
| Zinc Sulfate | 2.01 mg/L |
| Cobalt chloride | 2.2 mg/L |

1.2 Seed liquid culture conditions: the primary seed liquid was prepared using the seed medium shown in Table 14, and the activated strain FXFB001 of the present disclosure was selected and inoculated into a 250 mL triple-concave Erlenmeyer flask containing 50 mL of the medium and cultured at a constant temperature and 200 rpm for 22 h. The secondary seed liquid was prepared with the seed medium in Table 14, and transferred into a 3 L triple-concave Erlenmeyer flask containing 1 L seed medium at a 6% inoculation amount, and cultured in a shaker at 220 rpm for 22 h. According to an inoculation amount of 10%, the secondary seed liquid was inoculated into a 10 L fermentation vessel containing the seed medium shown in Table 15. The fermentation was conducted for about 42 h at a ventilation rate of 11 L/min, a vessel pressure of 0.06 MPa, a stirring speed of 220 rpm, a temperature of 28° C., and an online ammonia solution to adjust a pH value to 5.0

1.3 Fermentation Culture to Produce Protein-Rich Mycelium:

1.3.1 The composition of the fermentation medium for producing protein-rich mycelium is shown in Table 16.

TABLE 16

| Fermentation medium 2 | |
|---|---|
| Component | Content (kg/m$^3$) |
| Glucose | 50 |
| Potassium sulfate | 0.8 |
| H3PO4 | 0.8 |
| Magnesium sulfate heptahydrate | 0.4 |
| Zinc sulfate heptahydrate | 0.008 |
| Manganese sulfate tetrahydrate | 0.04 |
| Calcium acetate | 0.3 |
| Defoamer | 0.1 |

1.4 Fermentation Culture Method:

According to an inoculation amount of 7%, the tertiary seed liquid cultured for 22 h was pumped into a 50 L fermentation vessel with 30 L fermentation medium 2 shown in Table 16 through a sterilized hose from the bottom valve; the ventilation rate was 1,100 L/h, and the vessel pressure was 0.05 MPa. When the reducing sugar in the fermentation medium was lower than 5 g/L, 50% of the medium was discharged and then the feeding component was added to the original volume within 20 min. The feed medium was fermentation medium 2, and the ventilation was adjusted to 1,400 L/h and the vessel pressure was 0.1 MPa; the pH value was controlled at 5.0 with ammonia water. The culture was conducted at 28° C. and 350 rpm with a dissolved oxygen rate of 40% for 120 h.

1.5 Post-Treatment of Fermentation Culture

1) Heat treatment: after fermentation, the fermentation broth was heated to 65° C. and kept for about 20 min, then heated to 90° C. and kept for about 10 min, and then cooled to room temperature.

2) Filter pressing and refrigeration: the fermentation broth after heat treatment was filtered by a plate and frame filter press. After sufficient washing and ventilation, a filter cake was taken out and stored at 4° C.

3) Detection: samples for crude protein determination were pretreated, dried, crushed, and passed through a 60-mesh sieve, and then determined in accordance with "GB5009.5-2016 National Food Safety Standard-Determination of Protein in Foods". The detection of common fungal toxins in food was performed by a third party, SGS.

Under the above fermentation culture conditions, no toxins were detected in the mycelium produced by the strain FXFB001. By dry mass, the total fat content was 8.0%, the crude protein content was 60.5%, and the dietary fiber content was 26.0%.

Example 7

A Microbial Inoculant Including the Strain FXFB001

The *Fusarium brachygibbosum* strain FXFB001 was expanded and cultured according to the method in Example 3 to obtain a tertiary seed liquid, added with 50% glycerol, and frozen at −80° C.

Example 8

Method for Preparing a Meat Substitute (Edible Fungus Protein-Based Sausage) Using the Mycelium of Example 5

The following raw materials were accurately weighed: 40 kg of the edible mycelium, 58 kg of ice water, 0.1 kg of monosodium glutamate, 0.7 kg of yeast extract, 1 kg of edible sugar, 0.5 kg of meat flavor, 3 kg of sunflower oil, 0.6 kg of edible salt, 0.6 kg of spices, 2 kg of starch, 2.5 kg of carrageenan, and 0.106 kg of capsanthin.

The preparation method included the following steps:

1. The carrageenan, starch and a part of ice water were mixed, chopped and stirred evenly. An obtained mixture was added with the edible mycelium, monosodium glutamate, sugar, food flavor, plant oil, edible salt, spices, pigment, and remaining part of the ice water, and a resultant was mixed evenly.

2. The meat filling was filled into nylon casings through a filling machine. The resulting sausages were hung on rods, placed in a smoking oven, then dried at 60° C. for 20 min and steamed at 95° C. for 20 min.

3. The sausages were taken out, blown with cold air to below 25° C., and packaged.

4. The packaged sausages were quick-frozen and stored.

The above descriptions are merely preferred embodiments of the present disclosure. It should be noted that a person of ordinary skill in the art may further make several improvements and modifications without departing from the principle of the present disclosure, but such improvements and modifications should be deemed as falling within the protection scope of the present disclosure.

What is claimed is:

1. A method for producing an edible mycelium using *Fusarium brachygibbosum*, comprising the following steps:
   inoculating a seed liquid prepared from the *Fusarium brachygibbosum* or a microbial inoculant thereof into a fermentation medium to allow fermentation culture to obtain a fermentation broth; and
   sterilizing the fermentation broth, and separating a resulting fermentation product to obtain the edible mycelium; wherein
   the *Fusarium brachygibbosum* is the *Fusarium brachygibbosum* strain FXFB001 which is deposited under accession number CGMCC NO: 41066.

2. The method according to claim 1, wherein the fermentation medium comprises a fermentation medium 1 and/or a fermentation medium 2;
   the fermentation medium 1 comprises the following components: 23 g/L to 27 g/L of starch, 0.8 g/L to 1.2 g/L of citric acid, 0.8 g/L to 1.2 g/L of potassium dihydrogen phosphate, 4.5 g/L to 5.5 g/L of ammonium sulfate, 17 mg/L to 21 mg/L of a magnesium salt based on Mg, 2.8 mg/L to 43 mg/L of a calcium salt based on Ca, 0.48 mg/L to 0.62 mg/L of a manganese salt based on Mn, 0.96 mg/L to 1.05 mg/L of a ferric salt or a ferrous salt based on Fe, 0.72 mg/L to 0.91 mg/L of a zinc salt based on Zn, 0.44 mg/L to 0.54 mg/L of a cobalt salt based on Co, and 0.08 mg/L to 0.12 mg/L of a multivitamin; and
   the fermentation medium 2 comprises the following components: (15-60) kg/$m^3$ of glucose, (0.5-1.5) kg/$m^3$ of $K_2SO_4$, (0.4-0.8) kg/$m^3$ of $H_3PO_4$, (9.75-58.5) g/$m^3$ of a magnesium salt based on Mg, (2.2-22.5) g/$m^3$ of a zinc salt based on Zn, (2.46-9.85) g/$m^3$ of a manganese salt based on Mn, (0.1-0.3) kg/$m^3$ of calcium acetate, and (0.08-0.12) kg/$m^3$ of a defoamer.

3. The method according to claim 2, wherein when the fermentation culture is conducted using the fermentation medium 1, the fermentation culture specifically comprises the following steps:
   conducting the fermentation culture under ventilation with a ventilation rate of 900 L/h to 1,100 L/h at a pressure of 0.04 MPa to 0.06 MPa for 15 h; and conducting feeding at 0.5 mL/L/h to 2.0 mL/L/h under ventilation with a ventilation rate of 1,400 L/h to 1,600 L/h at a pressure of 0.08 MPa to 0.12 MPa after the fermentation culture is conducted for 15 h; wherein the fermentation broth has a pH value of 4.0 to 6.0;

the fermentation culture is conducted at 27° C. to 29° C. and 100 rpm to 450 rpm with coupled dissolved oxygen of 20% to 50% for 68 h to 76 h;

a feeding component for the feeding comprises 280 g/L to 320 g/L of glucose and 0.08 mg/L to 0.12 mg/L of a multivitamin; and the multivitamin comprises the following components in parts by mass: 0.08 parts to 0.12 parts of vitamin B1, 0.08 parts to 0.12 parts of vitamin B12, 0.08 parts to 0.12 parts of vitamin B2, 0.08 parts to 0.12 parts of vitamin B3, 0.08 parts to 0.12 parts of vitamin B5, 0.08 parts to 0.12 parts of vitamin B6, 0.08 parts to 0.12 parts of vitamin B9, 0.08 parts to 0.12 parts of vitamin C, and 0.08 parts to 0.12 parts of vitamin H.

4. The method according to claim 2, wherein when the fermentation culture is conducted using the fermentation medium 2, the fermentation culture is specifically conducted under ventilation at a ventilation rate of 900 L/h to 1,600 L/h and at a pressure of 0.04 MPa to 0.12 MPa; the fermentation broth has a pH value of 4.0 to 6.0;

the fermentation culture is conducted at a temperature of 27° C. to 29° C., a stirring speed of 100 rpm to 450 rpm, and a dissolved oxygen rate of 20% to 50% for 72 h to 480 h; and 20% to 90% of the fermentation broth by volume is discharged and the fermentation medium 2 is supplemented to an original volume when a reducing sugar content in a fermentation system is less than 2 g/L to 5 g/L.

5. The method according to claim 1, wherein the preparing the seed liquid with the *Fusarium brachygibbosum* comprises the following steps:

inoculating the Fusarium brachygibbosum into a first seed medium to allow primary seed culture and secondary seed culture in sequence to obtain a secondary seed liquid; and inoculating the secondary seed liquid into a second seed medium to allow tertiary seed culture to obtain a tertiary seed liquid.

6. The method according to claim 5, wherein the first seed medium comprises the following components: 28 g/L to 32 g/L of glucose, 23 g/L to 27 g/L of a yeast extract powder, 0.8 g/L to 1.2 g/L of potassium dihydrogen phosphate, 17 mg/L to 21 mg/L of a magnesium salt based on Mg, and 3 mg/L to 4 mg/L of a calcium salt based on Ca; and the second seed medium comprises the following components: 23 g/L to 27 g/L of starch, 0.8 g/L to 1.2 g/L of citric acid, 0.8 g/L to 1.2 g/L of potassium dihydrogen phosphate, 4.8 g/L to 5.2 g/L of ammonium sulfate, 17 mg/L to 21 mg/L of a magnesium salt based on Mg, 0.003 g/L to 0.004 g/L of a calcium salt based on Ca, 0.48 mg/L to 0.62 mg/L of a manganese salt based on Mn, 0.96 mg/L to 1.05 mg/L of a ferric salt or a ferrous salt based on Fe, 0.72 mg/L to 0.91 mg/L of a zinc salt based on Zn, and 0.44 mg/L to 0.54 mg/L of a cobalt salt based on Co.

7. The method according to claim 5, wherein the primary seed culture, the secondary seed culture, and the tertiary seed culture are independently conducted at 25° C. to 30° C.;

the primary seed culture, the secondary seed culture, and the tertiary seed culture are independently conducted for 22 h to 26 h;

the primary seed culture, the secondary seed culture, and the tertiary seed culture are independently conducted at 100 rpm to 200 rpm;

the tertiary seed culture is conducted with an aeration rate of 8 L/min to 12 L/min;

the tertiary seed culture is conducted at a pressure of 0.04 MPa to 0.06 MPa; and the tertiary seed culture is conducted in a culture system at a pH value of 4.0 to 6.0.

8. The method according to claim 1, wherein the fermentation broth is sterilized by heating sterilization; and the heating sterilization comprises: heating to a first temperature of 60° C. to 70° C. and maintaining the first temperature for 18 min to 22 min, and then heating to a second temperature of 88° C. to 92° C. and maintaining the second temperature for 8 min to 15 min.

9. The method according to claim 1, wherein the separating the fermentation product comprises: subjecting the fermentation broth to solid-liquid separation, and subjecting a resulting solid phase to washing and drying in sequence to obtain the edible mycelium.

10. The method according to claim 1, wherein the *Fusarium brachygibbosum* comprises a spore form and/or a mycelium form.

* * * * *